United States Patent
Mizutome et al.

(10) Patent No.: US 7,469,413 B1
(45) Date of Patent: Dec. 23, 2008

(54) RECEIVING APPARATUS, METHOD THEREFOR, SIGNAL PROCESSING APPARATUS, METHOD THEREFOR AND MEMORY MEDIUM

(75) Inventors: Atsushi Mizutome, Hayama-machi (JP); Shuntaro Aratani, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/531,959

(22) Filed: Mar. 21, 2000

(30) Foreign Application Priority Data

Mar. 24, 1999 (JP) .................. 11-079359
Sep. 7, 1999 (JP) .................. 11-252969

(51) Int. Cl.
H04N 5/445 (2006.01)
G06F 3/00 (2006.01)
G06F 13/00 (2006.01)

(52) U.S. Cl. ............... 725/48; 725/49; 725/59
(58) Field of Classification Search ............ 725/48–49, 725/59, 53
See application file for complete search history.

(56) References Cited

U.S. PATENT DOCUMENTS

| | | | | |
|---|---|---|---|---|
| 5,517,254 A * | 5/1996 | Monta et al. ............... | 348/569 |
| 5,550,576 A * | 8/1996 | Klosterman ................ | 725/46 |
| 5,686,954 A * | 11/1997 | Yoshinobu et al. .......... | 725/43 |
| 5,751,372 A * | 5/1998 | Forson ..................... | 725/49 |
| 5,801,787 A * | 9/1998 | Schein et al. .............. | 725/43 |
| 5,808,694 A * | 9/1998 | Usui et al. ................ | 725/49 |
| 5,828,945 A * | 10/1998 | Klosterman ................ | 455/42 |
| 5,883,677 A | 3/1999 | Hofmann .................. | 548/384 |
| 5,900,916 A * | 5/1999 | Pauley ..................... | 725/59 |
| 5,982,411 A * | 11/1999 | Eyer et al. ................ | 725/49 |
| 6,002,394 A * | 12/1999 | Schein et al. .............. | 725/39 |
| 6,023,267 A * | 2/2000 | Chapuis et al. ............ | 345/810 |
| 6,133,910 A * | 10/2000 | Stinebruner ............... | 725/49 |
| 6,144,376 A * | 11/2000 | Connelly .................. | 725/44 |
| 6,172,677 B1 * | 1/2001 | Stautner et al. ............ | 345/716 |
| 6,239,794 B1 | 5/2001 | Yuen et al. ................ | 725/41 |
| 6,321,382 B1 * | 11/2001 | Wugofski .................. | 725/59 |
| 6,348,932 B1 * | 2/2002 | Nishikawa et al. .......... | 345/719 |
| 6,507,951 B1 * | 1/2003 | Wugofski .................. | 725/59 |
| 6,526,576 B1 * | 2/2003 | Kwoh ...................... | 725/39 |
| 6,529,680 B1 * | 3/2003 | Broberg ................... | 386/83 |
| 6,600,503 B2 * | 7/2003 | Stautner et al. ............ | 345/854 |

FOREIGN PATENT DOCUMENTS

| | | |
|---|---|---|
| CN | 1176726 | 3/1998 |
| CN | 1185257 | 6/1998 |
| EP | 0 774 868 | 5/1997 |
| EP | 0 834 798 | 10/1997 |
| WO | WO 98/47284 | 10/1998 |

\* cited by examiner

Primary Examiner—Hunter B. Lonsberry
(74) Attorney, Agent, or Firm—Fitzpatrick, Cella, Harper & Scinto

(57) ABSTRACT

There is disclosed a receiving apparatus provided with reception means for receiving a television signal, plural input means for entering program information data relating to the television broadcasting, display means for displaying an image relating to the television signal received by the reception means and program information relating to the program information data entered by the input means, and control means for controlling the display means so as to display plural program information relating to the plural program information data entered by the plural input means, on a same image.

5 Claims, 21 Drawing Sheets

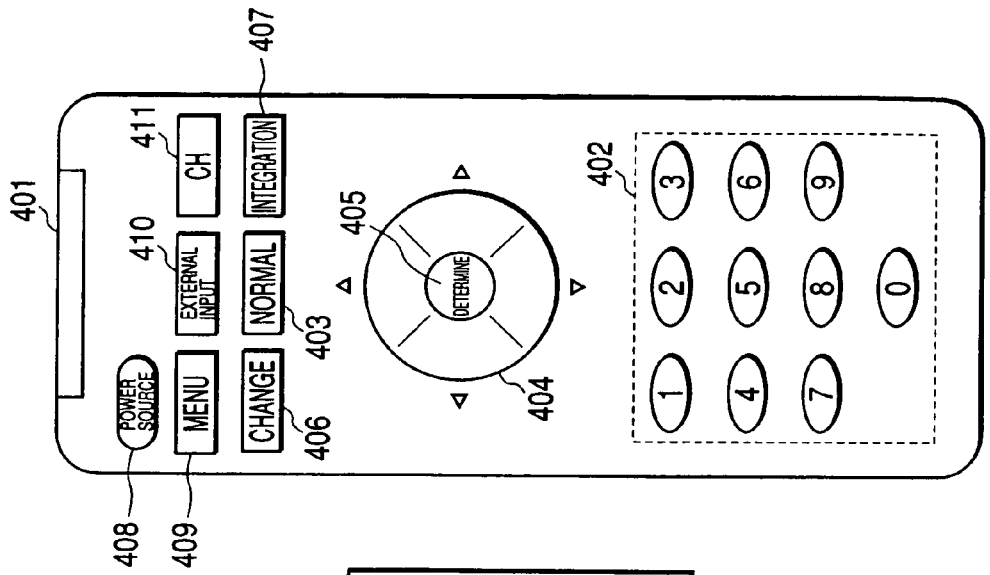
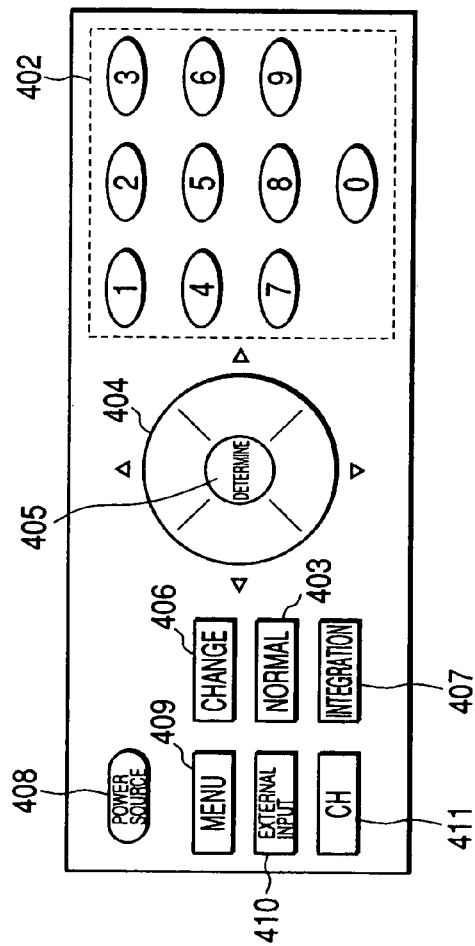

FIG. 5

```
NORMAL EPG DISPLAY SWITCHING SCREEN

GROUND  BS [CS] CATV CR-ROM
WAVE

DECEMBER [ 24 ] ,1999

FROM [ 16 ] HOUR

FROM [ 87 ] ch
```

FIG. 6

```
INTEGRATION EPG DISPLAY SWITCHING SCREEN

SETTING NO. [ 1 ]  MAIN1 : CS   DETAILS : EACH
                   MAIN2 : CATV          STATION

DECEMBER [ 24 ] ,1999

FROM [ 16 ] HOUR

FROM [ 95 ] ch
```

FIG. 7

```
INTEGRATION EPG DISPLAY SWITCHING SCREEN

SETTING NO. [ 1 ]  MAIN1 : CS   DETAILS : EACH
                   MAIN2 : CATV          STATION

DECEMBER [ 24 ] ,1999

FROM [ 16 ] HOUR

FROM [ 87 ] ch
```

FIG. 8

| 1998.12.24(TH) 16:02 | | 102ch | | | | |
|---|---|---|---|---|---|---|
| MENU | FAVORITE | | | | | REPRESENTATIVE IMAGE |
| GENRE | EXTERNAL INPUT | | | LOGO | | |
| | | | 87 | 87 | 95 | 102 |
| NEWS | | 16 | FITNESS MUSCLE LECTURES | UK BEAT | THE STRONGEST MEN | THURSDAY THEATER "XXX MURDER CASE" |
| WEATHER REPORT | | 17 | FIS SKI COMPETITION IN NORWAY | WESTERN MUSIC TOP 20 | K2 GRAND PRIX | FALLING FOR ○○ |
| TRAFFIC INFORMATION | | 18 | SNOW WORLD | WELCOME TO JP | FINAL GAME | |
| EXTERNAL MEDIA | | 19 | LET'S ENJOY SNOW-BOARDING | NEW CLIP | QUINTESSENCE OF KYOKUSHIN | TEAR OF XX |
| DVCR1 WORLD SEVEN MYSTERIES | | | | | | |
| DVD-ROM xxxLIVE IN MOSCOW XXXXX | | | | | | |

FIG. 12

| 1998.12.24(TH) 16:02 | | 87ch | | | | |
|---|---|---|---|---|---|---|
| MENU | FAVORITE | | | | LOGO | REPRESENTATIVE IMAGE |
| GENRE | EXTERNAL INPUT | | 87 | 87 | 95 | 102 |
| NEWS | | 16 | FITNESS | UK BEAT | THE STRONGEST MEN | THURSDAY THEATER |
| WEATHER REPORT | | | MUSCLE LECTURES | WESTERN MUSIC TOP 20 | K2 GRAND PRIX | "XXX MURDER CASE" |
| TRAFFIC INFORMATION | | 17 | FIS SKI COMPETITION IN NORWAY | | | |
| | | 18 | SNOW WORLD | WELCOME TO JP | FINAL GAME | FALLING FOR ○○ |
| EXTERNAL MEDIA | | | | | | |
| DVCR1 WORLD SEVEN MYSTERIES | | 19 | LET'S ENJOY SNOW-BOARDING | NEW CLIP | QUINTESSENCE OF KYOKUSHIN | TEAR OF XX |
| DVD-ROM xxxLIVE IN MOSCOW XXXXX | | | | | | |

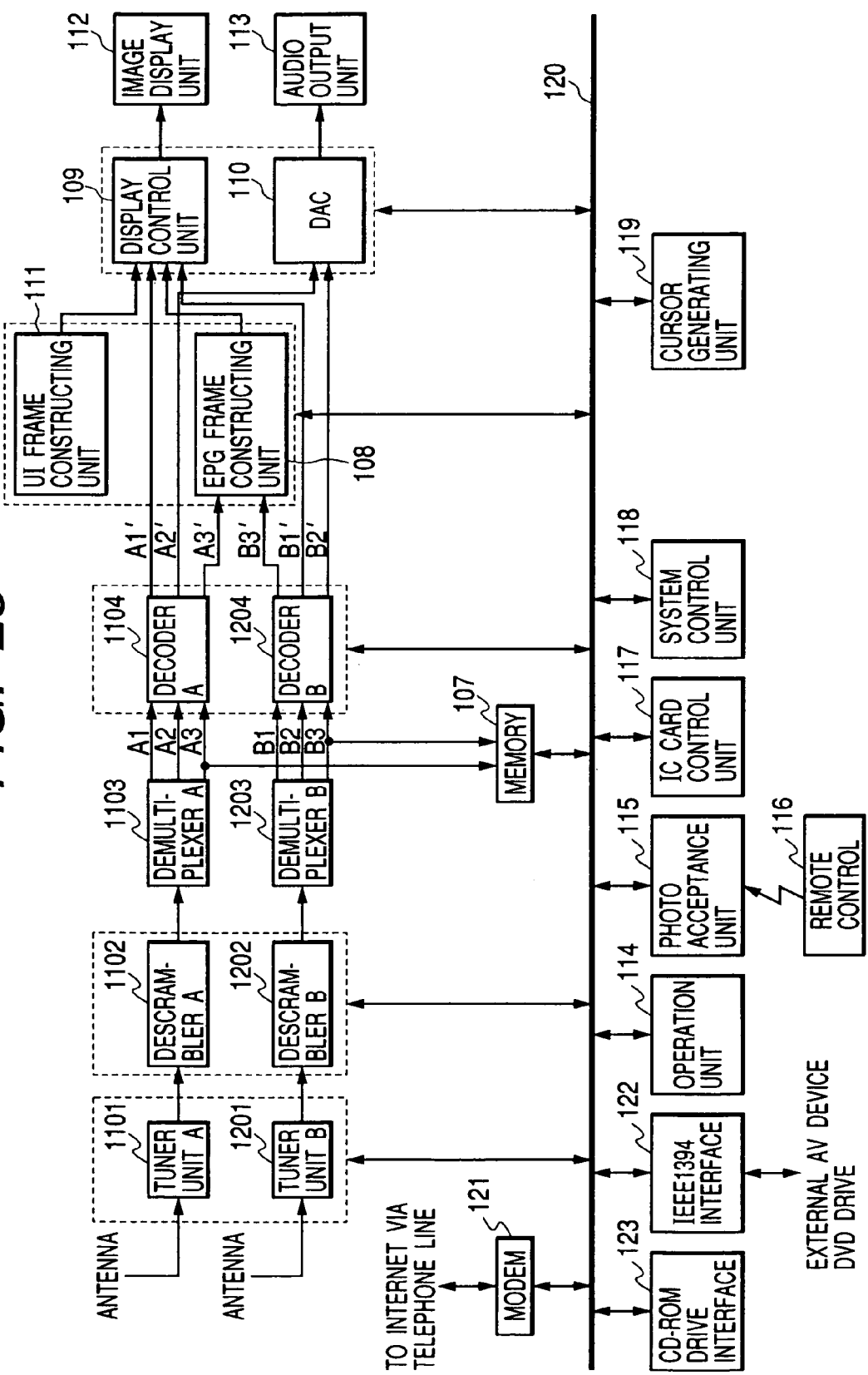

RECEIVING APPARATUS, METHOD THEREFOR, SIGNAL PROCESSING APPARATUS, METHOD THEREFOR AND MEMORY MEDIUM

BACKGROUND OF THE INVENTION

1. Field of the Invention

The present invention relates to a receiving apparatus, and more particularly to display of electric program guide (EPG) data transmitted in the digital television broadcasting.

2. Related Background Art

In the current digital satellite television broadcasting utilizing the communication satellite (CS), the electric program guide (EPG) data are broadcast together with the image data as a part of the services to the observers. Also similar service is anticipated in the currently planned digital satellite TV broadcasting utilizing the broadcast satellite (BS) or the ground wave digital TV broadcasting (such digital satellite TV broadcasting and ground wave satellite TV broadcasting will hereinafter be collectively called "digital TV broadcasting").

The EPG data are received by a receiver, and the program information (program table) by the EPG data are displayed on a display device. The EPG data includes the channel name, program name, broadcasting date and time, content of the program etc., and the user can judge the value of the program.

However the EPG data in the current broadcasting system are not interchangeable among different broadcasting entities and are independently transmitted by each CS broadcasting entity or CATV broadcasting entity. For this reason, in case the user engaged with plural broadcasting entities wishes to search a desired program from all the available programs regardless of the broadcasting path, it has been necessary to display the EPG for each broadcasting entity and search the desired program from such displays.

The program supply paths to each home will further increase when the digital satellite TV broadcasting utilizing the broadcast satellite and the ground wave digital TV broadcasting currently planned are started hereafter.

Also the EPG data will become available not only through the broadcast waves but also from an internet site such as a TV guide site or packaged media such as a CD-ROM attached to a magazine.

The program search will become further complicated with the increase hereafter of the supply sources of the EPG data.

Furthermore, in the BS digital TV broadcasting or in the ground wave digital TV broadcasting, the form of transmission of the EPG data may hereafter change since there will appear plural broadcasting entities for which the public character is required. For example, the minimum program information as currently published in the TV column of newspapers may be broadcast as the information common to all the stations (hereinafter called "all-station EPG") in the same content from all the stations, while the more detailed program information (hereinafter called "station specific EPG") may be transmitted in a channel belonging to each station.

In such case the user judges the value of the program by at first observing the outline information by the all-station EPG and then obtaining the detailed program information by the station-specific EPG, so that there are required cumbersome operations.

SUMMARY OF THE INVENTION

In consideration of the foregoing, an object of the present invention is to provide a receiving apparatus, a method therefor, a signal processing apparatus and a method therefor, enabling an EPG image display allowing easy search of the desired program.

Another object of the present invention is to provide a receiving apparatus, a method therefor, a signal processing apparatus and a method there for, enabling EPG image display of high recognizability, from plural EPG data.

The above-mentioned objects can be attained, according an embodiment of the present invention, by A television signal receiving apparatus, comprising:

a) a reception unit for receiving a television signal;

b) plural input units for entering program information data relating to television broadcasting;

c) a display unit for displaying an image relating to the television signal received by the reception unit and program information relating to the program information data entered by the plural input units;

d) an instruction unit for instructing display of a program table; and e) a control unit for controlling the display unit in such a manner as to display, according to the instruction by the instruction unit, plural program information relating to the plural program information data entered by the plural input units, on a same image.

Still other objects of the present invention, and the features thereof, will become fully apparent from the following detailed description of the embodiments, to be taken in conjunction with the accompanying drawings.

BRIEF DESCRIPTION OF THE DRAWINGS

FIGS. 4A and 4B are views showing an operation unit 114 and a remote controller 116 shown in FIG. 1;

FIG. 5 is a view showing an example of display of an normal EPG display switching image;

FIG. 6 is a view showing examples of display of an integrated EPG display switching image;

FIG. 7 is a view showing examples of display of an integrated EPG display switching image;

FIG. 8 is a view showing an example of display of an integrated EPG display image;

FIG. 12 is a view showing examples of display of an integrated EPG image based on the result of search;

FIG. 23 is a block diagram showing the configuration of a digital TV broadcast receiving apparatus in which plural data of different encoding formats are entered.

DETAILED DESCRIPTION OF THE PREFERRED EMBODIMENTS

Now the present invention will be clarified in detail by preferred embodiments thereof, with reference to the attached drawings.

Figure 1:
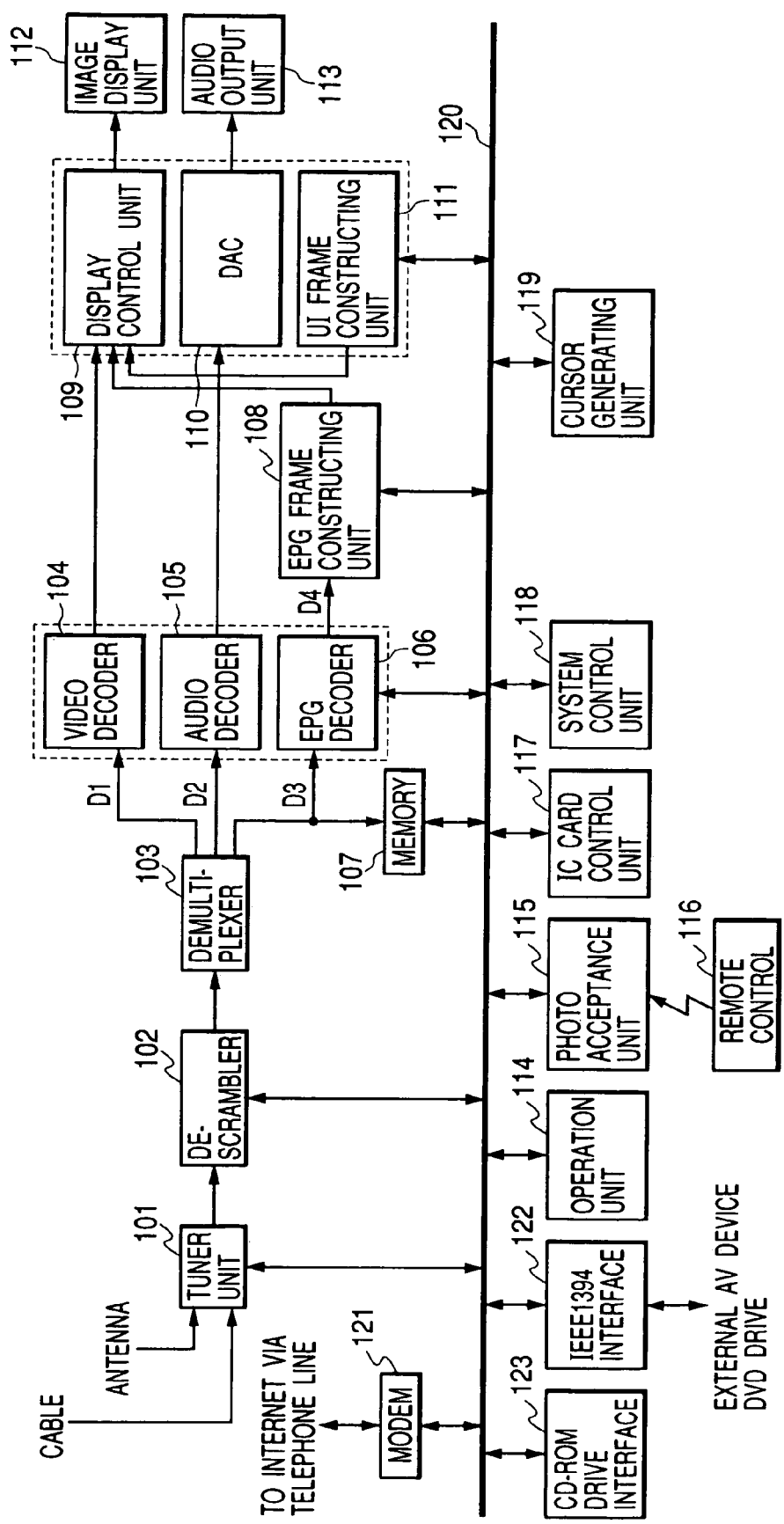
FIG. 1 is a block diagram showing the configuration of a digital TV broadcast receiving apparatus constituting a first embodiment of the present invention.

FIG. 1 is a block diagram showing the configuration of a digital TV broadcast receiving apparatus constituting a first embodiment of the present invention.

Referring to FIG. 1, a signal supplied from an antenna or a cable (not shown) is entered into a tuner unit 101, including an unrepresented tuner for the signal supplied from the antenna and an unrepresented tuner for the signal supplied from the cable. Each tuner applies processes such as demodulation and error correction to each received signal, thereby generating digital data called a transport stream, and sends the generated transport stream (TS) to a descrambler 102.

When the TS data scrambled for limiting the viewing are entered from the tuner unit 101, the descrambler 102 executes descrambling based on the key information for descrambling contained in the TS data and the key information outputted from an IC card control unit 117, and sends the descrambled data to a demultiplexer 103.

The IC card control unit 117 includes an IC card storing key information for decoding the descrambling key information contained in the agreement information of the user and the TS data, and, if there is key information for decoding the descrambling key information entered from the descrambler 102, the IC card control unit 117 sends such key information to the descrambler 102.

Also in case unscrambled TS data are entered from the tuner unit 101, the descrambler 102 sends such TS data directly to the demultiplexer 103.

The demultiplexer 103 extracts, from the TS data entered from the descrambler 102 and containing the video and audio data of plural channels and the EPG data in time-shared multiplex manner, video data D1 and audio data D2 of a program currently broadcast in a channel selected by an operation unit 114 and outputs these data respectively to a video decoder 104 and an audio decoder 105. The demultiplexer 103 also extracts EPG data D3 from the above-mentioned TS data and outputs such EPG data to a memory 107.

The memory 107 stores the EPG data D3 from the demultiplexer 103. The EPG data stored in the memory 107 are received periodically and are always renewed to latest data. There is also executed an acquiring operation for the EPG data in case there is instructed normal EPG (normal program table) display and integrated EPG (integrated program table) display by the operation unit 114 or the remote controller 116 as will be explained later.

The memory 107 further stores the EPG data from the internet, entered through an unrepresented telephone line and a modem 121, and the EPG data from package media such as a memory card, entered through an IEEE 1394 interface 122 or a CD-ROM drive interface 123.

The TS data are transmitted in the unit of a packet, having a PID (packet identification) at the head. The demultiplexer 103 detects the PID of each data based on PSI (program specific information) data such as PAT (program association table) and PMT (program map table) in the TS data and identifies the video data D1, audio data D2 or EPG data D3 based on the PID.

As shown in FIG. 1, various blocks are connected to a common bus 120.

At first there will be given an explanation on the video data. The video decoder 104 executes the MPEG2 decoding process on the video data D1 entered from the demultiplexer 103, and outputs the decoded video data to a display control unit 109.

The display control unit 109 switches and multiplexes, for display on an image display unit 112, the images corresponding to the image data entered from the video decoder 104, an EPG image construction unit 108 and a UI image construction unit 111. The EPG image construction unit 108 will be explained later. The image display unit 112 includes an unrepresented monitor and a video signal input terminal.

In the following there will be explained the audio data. The audio decoder 105 executes MPEG2 decoding process on the audio data D2 entered from the demultiplexer 103 and outputs the decoded audio data to a DAC 110, which executes D/A conversion on the audio data entered from the audio decoder 105 and outputs the converted audio data to an audio output unit 113. The audio output unit 113 includes an unrepresented speaker and an audio signal input terminal.

In the following there will be explained the EPG data. The data required for constituting the EPG are transmitted in a data structure defined for example by the IEC 13818-1 MPEG2 system or the ARIB standard "program presenting information to be used for the digital broadcasting".

The principal constituent data include SDT (service description table) for transmitting the information relating to the channel such as the name of the channel and the name of the broadcasting entity; BAT (bouquet association table) for transmitting the information relating to the bouquet (group of channels) such as the name of the bouquet and the channels contained therein; EIT (event information table) for transmitting the information relating to the program such as the name of the program, the data and time of start of broadcasting, and the explanation of the content; and YDY (time date table) for transmitting the information on the current data and time.

At first there will be explained the normal EPG display operation. When there is executed an operation for causing the normal EPG display in the operation unit 114 or the remote controller 116, the EPG display instruction received from the operation unit 114 or from the remote controller 116 through a light receiving unit 115 is entered into the system control unit 118.

In response to the EPG display instruction from the operation unit 114 or the light receiving unit 115, the system control unit 118 reads the necessary information from the memory 107 and sends such information to an EPG decoder 106.

The information read in this operation is the program information corresponding to an EPG input source, a channel and a broadcasting date, designated by the normal EPG switching image to be explained later, by the operation unit 114 or the remote controller 116.

Also in case the display is switched from a video image to the EPG image by the depression of a normal button to be explained later, the system control unit 118 reads, from the memory 107, the information of a channel displayed at the preceding normal EPG image display in the input source of the current video image, and also reads, from the memory 107, program information on a program broadcast at a time zone corresponding to the current time.

The EPG data include SDT, EIT, TDT etc. as explained before. The EPG decoder 106 at first reads the TDT from the EPG data multiplexed in the currently received TS thereby acquiring the information of the current time, and sends the information of the current time to the system control unit 118. Receiving the information of the current time, the system control unit 118 discriminates the time zone of the EPG display corresponding to the current time, and outputs the information of the appropriate time zone to the EPG decoder 106.

Then the EPG decoder 106 reads SDT from the memory 107 based on the time zone information entered from the system control unit 108, thereby confirming the presence or absence of the program table and acquiring the information such as the channel name and channel number of own and other streams.

The EPG decoder 106 further reads EIT from the memory 107 thereby acquiring the program name, starting time, category, program explanation etc. of own and other streams. Then the EPG decoder 106 executes decoding on the EPG data D3 thus read from the memory 103 and outputs the decoded EPG data D4 to the EPG image construction unit 109.

Based on the EPG data received from the EPG decoder 106, the EPG image construction unit 108 sends a character signal for constructing the normal EPG image to the display control unit 109.

According to the operation on the operation unit 114 or the remote controller 116, the display control unit 109 outputs a video signal to the image display unit 112 so as to selectively display an image corresponding to the video data outputted from the video decoder 104, an normal EPG image corresponding to the character signal from the EPG image construction unit 108, an integrated EPG image to be explained later, corresponding to a character signal outputted from the EPG image construction unit 108, or a UI image corresponding to a character signal from a UI image construction unit 111 to be explained later.

In case the operation in the operation unit 114 or the remote controller 116 instructs the normal EPG image display, a character signal corresponding to the normal EPG image outputted from the EPG image construction unit 108 is supplied to the image display unit 112.

The channel information thus displayed on the image display unit 112 is stored in the memory 107, and is read therefrom at the next EPG image display for re-displaying the EPG image as explained in the foregoing.

In the following there will be explained an integrated EPG display operation for displaying EPG's of different input sources on a same image. In case the operation of the operation unit 114 or the remote controller 116 instructs an integrated EPG display, such designation for the integrated EPG display from the operation unit 114 or from the remote controller 116 through the light receiving unit 115 is supplied to the system control unit 118.

In response to the instruction for the integrated EPG display from the operation unit 114 or the light receiving unit 115, the system control unit 118 reads the integrated EPG information from the memory 107 and sends it to the EPG decoder 106.

The information read in this operation is the program information corresponding to a channel and a broadcasting date, designated by the integrated EPG display switching image to be explained later, in an input source set by an integrated EPG setting image to be explained later.

Also in case the display is switched from a video image to the integrated EPG image by the depression of an integration button to be explained later, the system control unit 118 reads, from the memory 107, the information of a channel displayed at the preceding integrated EPG image display, and also reads, from the memory 107, program information on a program broadcast at the time zone corresponding to the current time.

Further, in order to avoid doubled display of EPG's of a same channel, the system control unit 118 searches the channels of a same channel code, thereby detecting a channel delivered from plural input sources. Also from the plural EPG data corresponding to thus detected channel, it extracts the EPG data from an input source set by a main EPG1 by a setting procedure to be explained later, and reads such EPG data from the memory 107.

Also in case of displaying detailed EPG for providing the detailed information on a program designated by a cursor in a program table 309 displaying the main EPG as will be explained later, the system control unit 118 searches, among the detailed EPG information stored in the memory 107, detailed EPG on a program same as the instructed program.

In this operation, if the detailed EPG and the main EPG are transmitted by a same input source, there can be discriminated whether these are of a same program by the comparison of ID's, since a unified specific ID is assigned to the EPG of each program. Such situation occurs for example in a case where the main EPG is all-station EPG and the detailed EPG is station-specific EPG.

On the other hand, in case the detailed EPG and the main EPG are transmitted from different input sources, the program ID alone cannot identify whether these information belong to a same program, so that the identification is made by discriminating whether the date, time, channel, character codes in the initial several characters of the program title etc. coincide in these information. Such situation occurs in a case where the main EPG is obtained from CS while the detailed EPG is obtained from a package media such as a CD-ROM or a memory card or from a TV guide site on the internet.

The EPG decoder 106 reads TDT from the memory 107 as explained in the foregoing, and sends the information of the current time to the system control unit 118. The system control unit 118 outputs, to the EPG decoder 106, the information of appropriate time zone discriminated from the integrated EPG information read from the memory 107 as explained in the foregoing and the current time information.

Then, based on the integrated EPG information and the time zone information entered from the system control unit 118, the EPG decoder 106 reads SDT from the memory 107, thereby confirming the presence or absence of the program table and acquiring the channel name, channel number etc. of own and other streams.

Also the EPG decoder 106 reads EIT from the memory 107, thereby acquiring the program name, starting time, category, program explanation etc. in each channel in own and other streams. The EPG decoder 106 executes decoding on such EPG data D3 read from the memory 107 and sends the decoded EPG data D4 to the EPG image construction unit 108.

The EPG image construction unit 108 sends, based on the EPG data D4 entered from the EPG decoder 106, a character signal for constituting the integrated EPG image to the display control unit 109.

The display control unit 109 sends a video signal to the image display unit 112 in order to execute switching display of the video image, EPG image etc. as explained before. In case the integrated EPG image display is instructed by the operation unit 114 or the remote controller 116, the character signal corresponding to the integrated EPG display, released from the EPG image construction unit 108, is supplied to the image display unit 112.

The display control unit 109 outputs the video signal so as to vary the format of the EPG display according to the input source on the integrated EPG image. For example the EPG is displayed with different colors respectively for a channel from CS, that from CATV, and that from CS and CATV.

Figure 2:
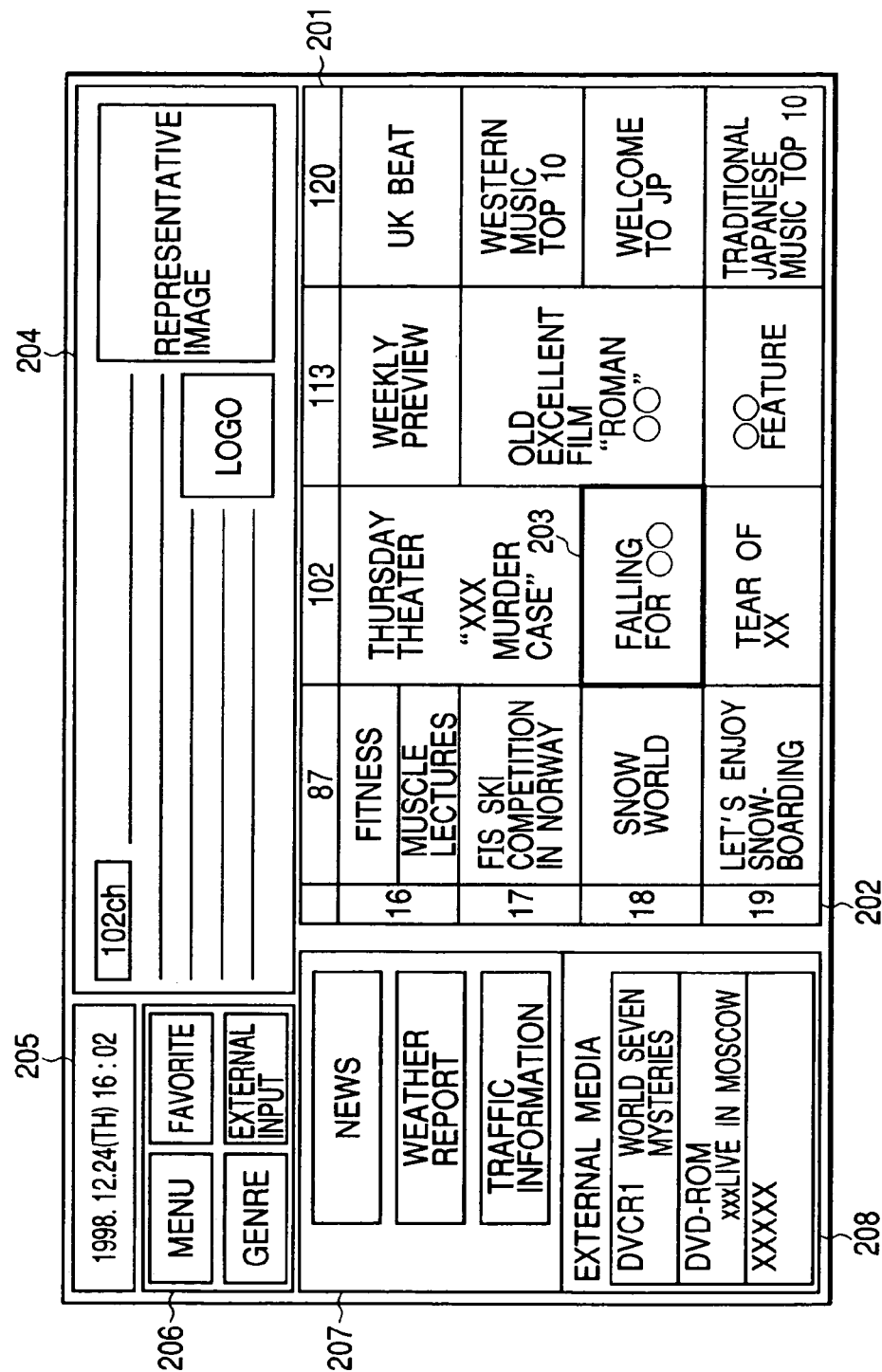
FIG. 2 is a view showing an example of display of an normal EPG image.

FIG. 2 shows an example of display of the normal EPG image, wherein shown are channel name and number 201; a time axis 202 for indicating the start and end time of each program; a cursor 203 for selecting each program; a detailed information area 204 for displaying the channel name, number, program title, broadcasting date and time, program content etc. of a program selected by the cursor, for example for the station-specific EPG; current date and time 205; a display switching GUI 206 for selecting a menu image, a genre searching image, a favorite EPG display image, an external input setting image etc.; a display switching GUI 207 for selecting information images such as of news, weather forecast, traffic information etc.; and a GUI 208 for indicating an externally connected medium and program information thereof.

Figure 3:
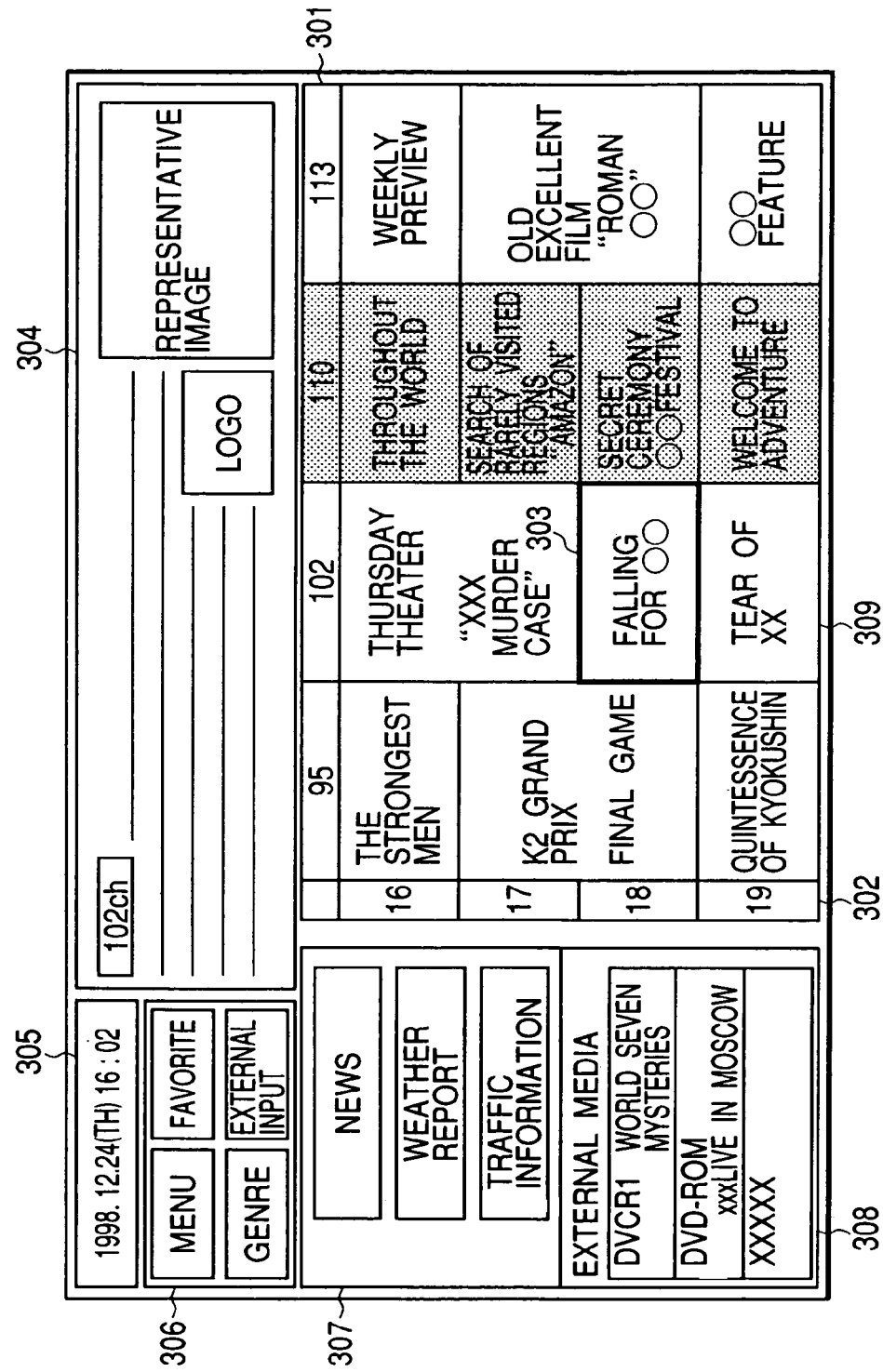
FIG. 3 is a view showing an example of display of an integrated EPG image.

FIG. 3 shows an example of display of the integrated EPG image, wherein shown are channel name and number 301; a time axis 302 for indicating the start and end time of each program; a cursor 303 for selecting each program; an information area 304 for displaying the channel name, number, program title, broadcasting date and time, program content etc. of a program selected by the cursor; current date and time 305; a display switching GUI 306 for selecting a menu image, a genre searching image, a favorite EPG display image, an external input setting image etc.; a display switching GUI 307 for selecting information images such as of news, weather forecast, traffic information etc.; and a GUI 308 for indicating an externally connected medium and program information thereof.

The selecting cursor is generated by a cursor generation unit 119 shown in FIG. 1, and is moved or executes area designation by the operations of the operation unit 114 or the remote controller 116. An example of the operation unit 114 and the remote controller 116 is shown in FIGS. 4A and 4B. However, these drawings only show the buttons required for realizing the functions of the present embodiment, and the operation buttons required in the actual receiving apparatus are not necessarily limited to the illustrated ones.

Also instead of the devices shown in FIGS. 4A and 4B, there may be employed a pointing device such as a mouse.

Referring to FIGS. 4A and 4B, there are shown a light emitting unit 401 for infrared communication between the remote controller and the light receiving unit 115 shown in FIG. 1; ten keys 402 for entering a channel number; a normal button 403 for displaying the normal EPG image; a cursor button 404 for moving the selecting cursor vertically and horizontally; a determination button 405 for determining the area designated by the cursor; a change button 406 for changing the content of the EPG display; an integration button 407 for displaying the integrated EPG; a power source button 408 for turning on/off the power supply; a menu button 409 for displaying an image for setting the integrated EPG or switching the displayed EPG; an external input button 410 for setting the connected external input device; and a channel button 411 for switching the channel.

In the following there will be explained the detailed operations on the normal EPG image display. The user can obtain the display of the normal EPG image as shown in FIG. 2, by depressing the normal button 403 shown in FIGS. 4A and 4B. By moving the selecting cursor 203 to the right by the cursor button 404 shown in FIGS. 4A and 4B, the EPG image scrolls in the direction of the channel displaying axis (lateral direction) to display the EPG image after the channel #113. Also by moving the selecting cursor 203 downwards, the EPG image scrolls in the direction of the time axis (vertical direction) to display the EPG image after 8 o'clock.

Also in case the user depresses the change button 406 shown in FIGS. 4A and 4B in the course of display of the normal EPG image, there is displayed a normal EPG display switching image as shown in FIG. 5. In the normal EPG display switching image, the input source of the desired EPG and the time zone and the channel of the desired EPG image are entered by the operation unit 114 and the remote controller 116 whereby the desired EPG image can be displayed without scrolling the EPG image.

FIG. 5 shows an example of display of the normal EPG display switching image, so set as to display the channels observable after p.m. 4 on Dec. 24, 1999 and starting from the channel #87.

The EPG image shown in FIG. 2 is also an example of the display obtained by setting in the normal EPG display switching image shown in FIG. 5.

In the following there will be explained the detailed functions of the integrated EPG image display. The user can obtain the integrated EPG image as shown in FIG. 3 by depressing the integration button 407 shown in FIGS. 4A and 4B. The image scrolling method is similar to that explained in relation to the normal EPG image.

Also in case the user depresses the change button 406 shown in FIGS. 4A and 4B in the course of display of the integrated EPG image, there is displayed an integrated EPG display switching image as shown in FIG. 6. In the integrated EPG display switching image, a desired pattern is selected from the combination patterns of the integrated EPG set by the setting operations to be explained later and the time zone and the channel of the desired integrated EPG image are entered by the operation unit 114 and the remote controller 116 whereby the desired integrated EPG image can be displayed without scrolling the integrated EPG image.

FIG. 6 shows an example of display of the integrated EPG display switching image, illustrating a setting 1 to be explained later, for displaying the integrated EPG in a state of displaying the EPG from CS in a main EPG1, the EPG from CATV from a main EPG2 and the respectively station-specific EPG in a detailed EPG. The integrated EPG in such setting is further so set as to display the channels observable after p.m. 4 on Dec. 24, 1999 and starting from the channel 95.

The integrated EPG image shown in FIG. 3 is also an example of the display obtained by setting in the integrated EPG display switching image shown in FIG. 6. A channel #95 from CATV, channels #102, #113 from CS and a channel #110 from CS and CATV are displayed with respectively different colors in the program information.

FIG. 7 shows an example of display of the integrated EPG display switching image, and an example of the integrated EPG image displayed according to the setting therein is shown in FIG. 8. In case different input sources and different channel contents a same channel number as shown in FIG. 8, they are displayed with respective display colors of the input sources. In the example shown in FIG. 8, the channel #87 transmitted from CS is displayed in white color while the channel #87 transmitted from CATV is displayed in gray color.

In the following there will be explained the setting method for the combination pattern of the integrated EPG. The menu button 409 shown in FIGS. 4A and 4B is depressed, and, within unrepresented menu items, a menu item is selected for displaying the integrated EPG setting image shown in FIG. 9A, thereby displaying the integrated EPG setting image.

In the present embodiment, there can be set up to three combination patterns for the integrated EPG, and the user selects one of such three setting patterns in the integrated EPG display switching image, thereby obtaining the display of the desired integrated EPG image.

Figure 9A:
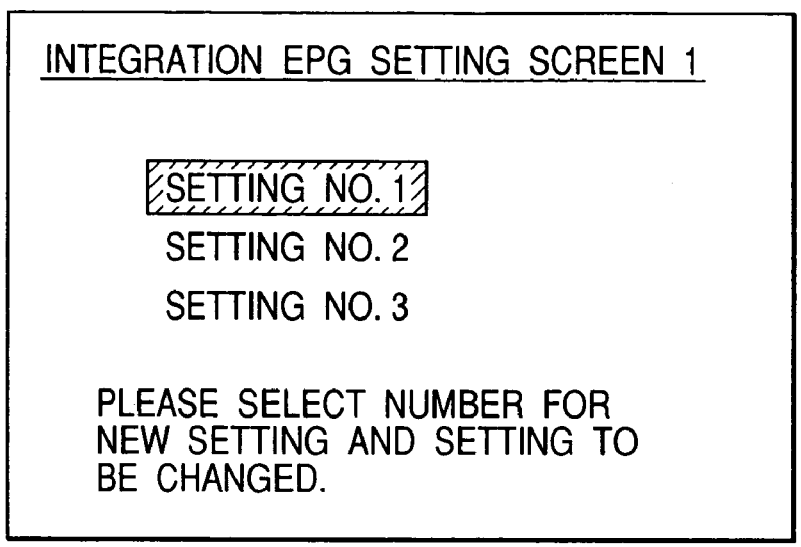
FIGS. 9A and 9B are views showing examples of display of an integrated EPG display setting image.

At first, in case of newly setting or altering any of the settings 1 to 3 in an integrated EPG setting image 1 shown in FIG. 9A, the operation unit 114 and the remote controller 116 are used to select the number of the desired setting pattern.

Figure 9B:
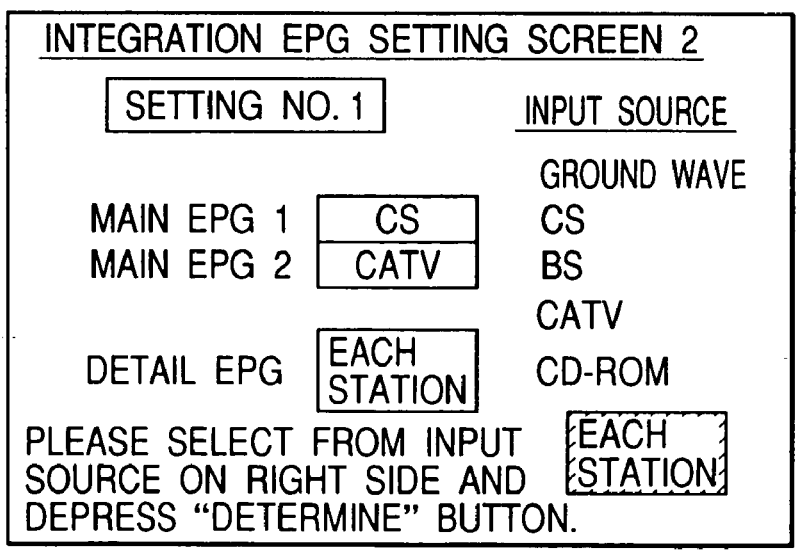

Then there is displayed an integrated EPG setting image 2 shown in FIG. 9B. In this image, the desired input source among the input sources connected to the receiving apparatus is set respectively in the main EPG1, the main EPG2 and the detailed EPG. The main EPG means the EPG displayed on the program table constituted by the channel number axis 301 and the time axis 302 in the integrated EPG image shown in FIG. 3, and the detailed EPG means the detailed information displayed in an area 304.

For example, in case of displaying the EPG's transmitted from CS and CATV in a same image and displaying the EPG from CS preferentially in case a same channel is transmitted both from CS and CATV, the CS and the CATV are respectively set in the main EPG1 and the main EPG2 as shown in FIG. 9B.

Also for the detailed EPG displayed in the area 304, there is selected and set a desired input source among the station-specific EPG and the package media such as CD-ROM. In the example shown in FIG. 9B, the station-specific EPG is set as the detailed EPG.

The integrated EPG in such setting 1 is the integrated EPG as shown in FIG. 3.

In the present embodiment, as the EPG data from plural input sources are displayed on a same image, the user can easily find the desired program information without switching the EPG image for each input source.

Also the EPG image display with improved recognizability can be obtained by varying the EPG display color for each input source.

Also, in the present embodiment, the EPG's of the observable channels are integrated from plural input sources and all such integrated EPG is displayed within the range designated by the user, but it is also possible to display only the EPG's searched, among the EPG information from plural input sources, by the system control unit 118 based on the search condition set by the user.

Figure 10A:
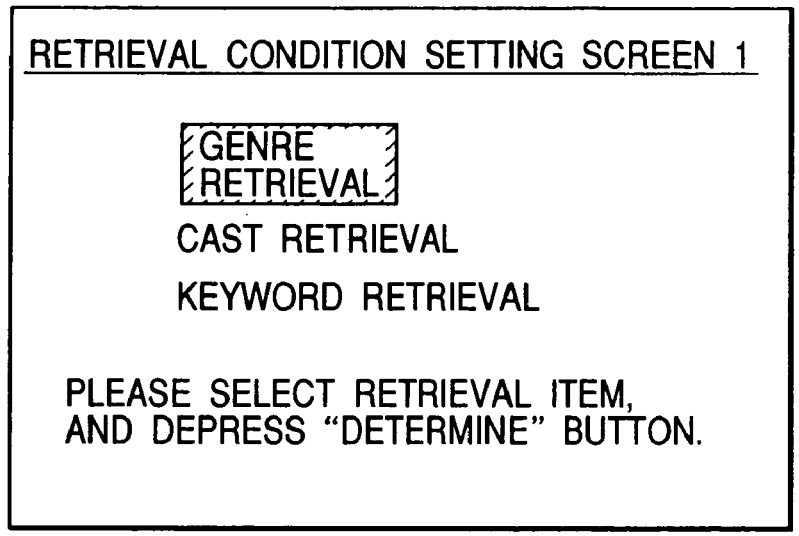
FIGS. 10A and 10B are views showing examples of display of a search condition setting image.
Figure 10B:
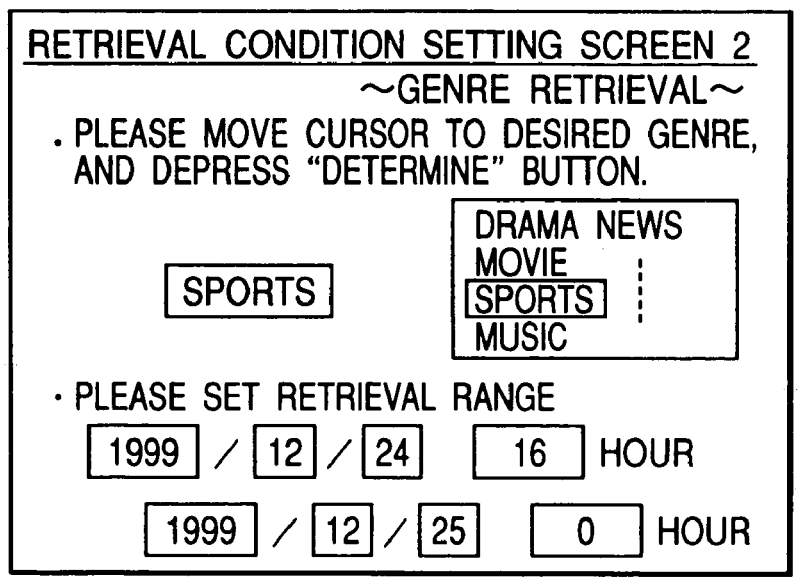
Figure 11:
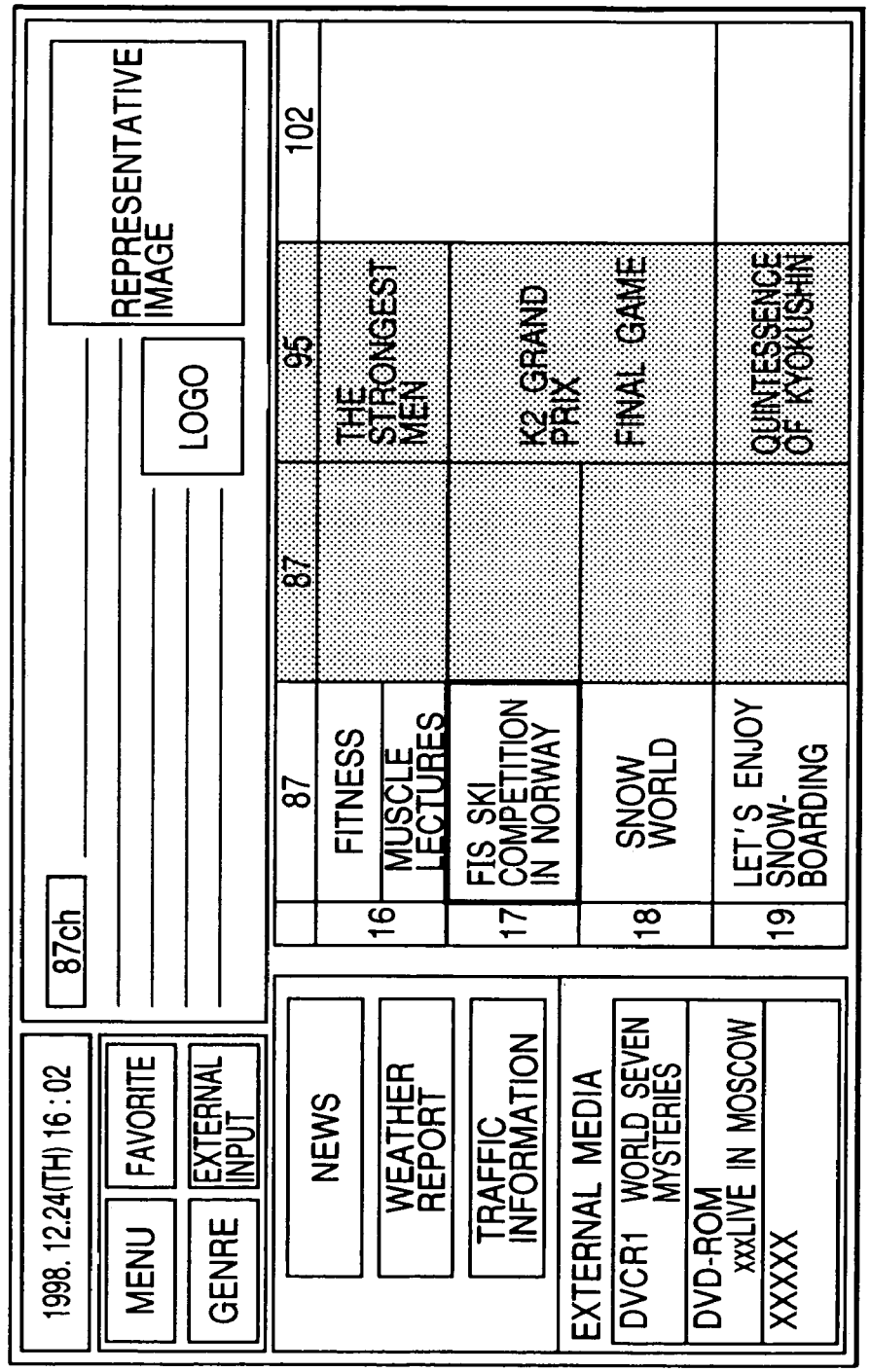
FIG. 11 is a view showing examples of display of an integrated EPG image based on the result of search.

FIG. 11 shows an example of the integrated EPG image showing only the EPG's searched according to the search condition set in a search condition setting image shown in FIGS. 10A and 10B.

In addition to the display from shown in FIG. 11, it is also possible to change the display form between the searched EPG and the non-searched EPG as shown in FIG. 12.

It is furthermore possible to list the searched results in the order of the broadcasting time.

Also, in the present embodiment, the EPG's from different transmission paths such as ground wave, CS, BS etc. are displayed on a same image, but it is also possible display the EPG's of plural TS data with different carrier waves receivable by the CS as the integrated EPG. In such case there may be provided plural tuners or a single tuner may be used on time-shared basis to fetch the EPG's from the plural TS data.

Similarly it is also possible to display the EPG's of plural TS data supplied from different cables, as the integrated EPG. For example the EPG's supplied from the respective cable lines in a CATV optical fiber cable may be integrated in the display.

Figure 13:
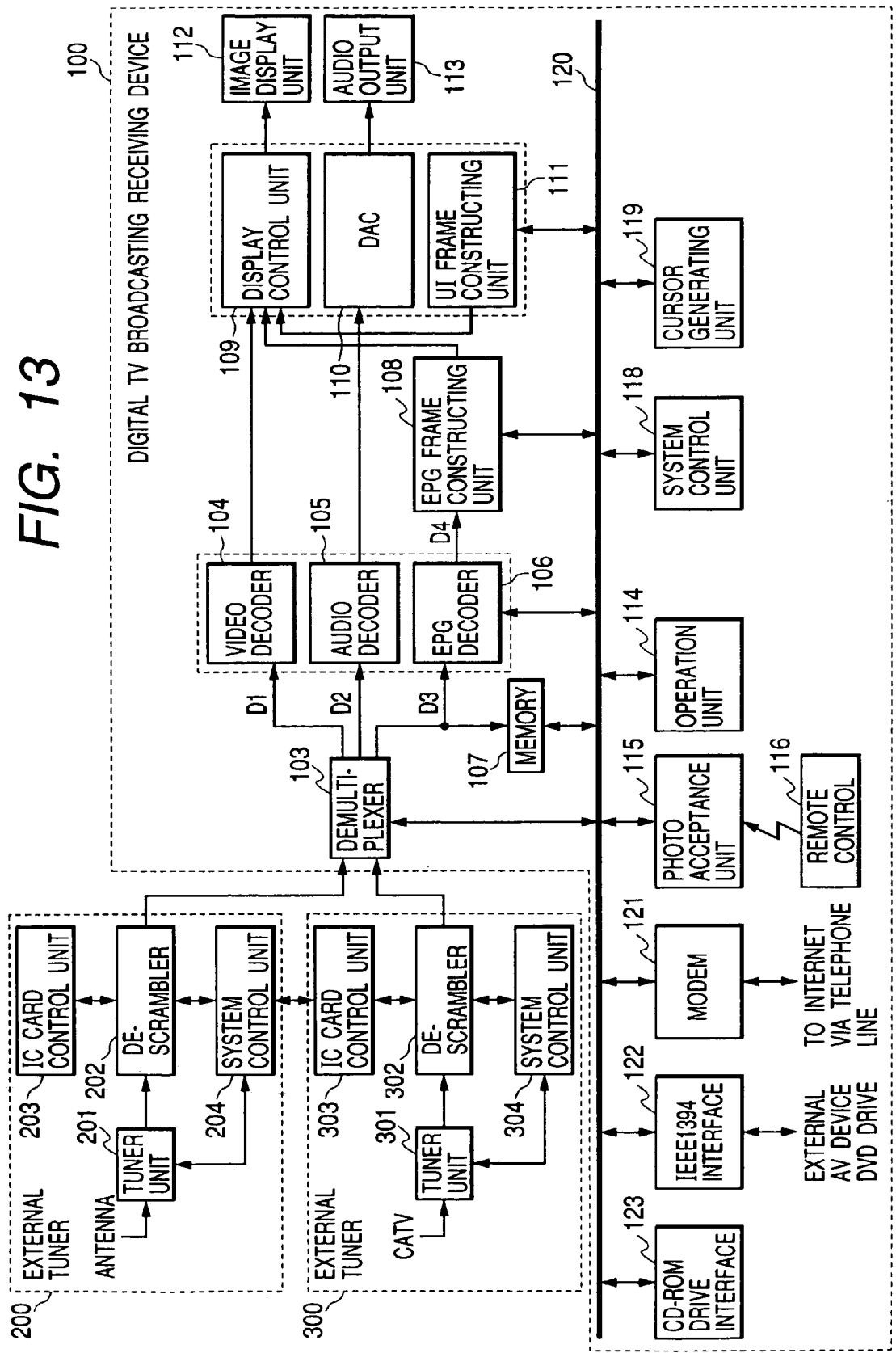
FIG. 13 is a block diagram showing the configuration of a digital TV broadcast receiving apparatus constituting a second embodiment of the present invention.

Also in the present embodiment, there are provided plural tuners for receiving the signals from different transmission paths, but there may be adopted a configuration as shown in FIG. 13, in which the television signals and the program information data relating to such television signal are entered from plural external receiving apparatus for receiving the respectively different transmission paths.

Referring to FIG. 13, external tuners 200, 300 are connected to a digital TV broadcast receiving apparatus 100. Tuner units 201, 301 respectively receive signals entered from an antenna and a cable (both not shown), and send signals to descramblers 202, 302. Units 202 to 204 in the external tuner 200 and those 302 to 304 in the external tuner 300 respectively correspond to the units 102, 117, 118 shown in FIG. 1 and perform functions executed therein.

Also in the present embodiment, there are entered EPG data encoded according to the MPEG2 standard, but the format of the input data is not limited to such standard and there may be employed the input data encoded in other methods.

Further, there may be entered the data of plural encoding formats and there may be adopted a configuration with plural decoders respectively corresponding to such data. FIG. 23 shows an example of such configuration, wherein components 107 to 123 respectively correspond to those in FIG. 1 and will not, therefore, be explained further.

A tuner A1101 to a demultiplexer A1103 and a tuner B1201 to a demultiplexer B1203 are respectively similar to the tuner unit 101 to the demultiplexer 103 in FIG. 1, and receives and processes the digital data of respectively different encoding formats. The demultiplexers A1103, B1203 respectively extract video data A1, B1 audio data A2, B2 and EPG data A3, B3 for output decoders A1104, B1204.

Each of the decoders A1104, B1204 is composed of a video decoder, an audio decoder and an EPG decoder, which correspond to each encoding format and are respectively similar to the video decoder 104, audio decoder 105 and EPG decoder 106 shown in FIG. 1. More specifically, the decoder A1104 decodes the entered video data A1 and sends the decoded video data A1' to the display control unit 109, also decodes the audio data A2 and sends the decoded audio data A2' to the DAC 110 and decodes the EPG data A3 and sends the decoded EPG data A3' to the EPG image construction unit 108. The decoder B1204 also executes similar operations.

Also in the present embodiment, there can be set two main EPG's but there may be set the EPG's of an arbitrary number for the different input sources.

Also in the present embodiment, there can be set three combination patterns for the integrated EPG, but there may set the patterns in an arbitrary number.

Also in the present embodiment, the video image and the EPG image are displayed on an internal monitor of the apparatus, but there may be provided a video output terminal for outputting the EPG data corresponding to the video signal and the video signal corresponding to the video data to an external display apparatus.

Also the present embodiment has been explained on a case of receiving the television signal, but the present invention is likewise applicable to the case of an audio signal or an information signal supplied through a network.

Figure 14:
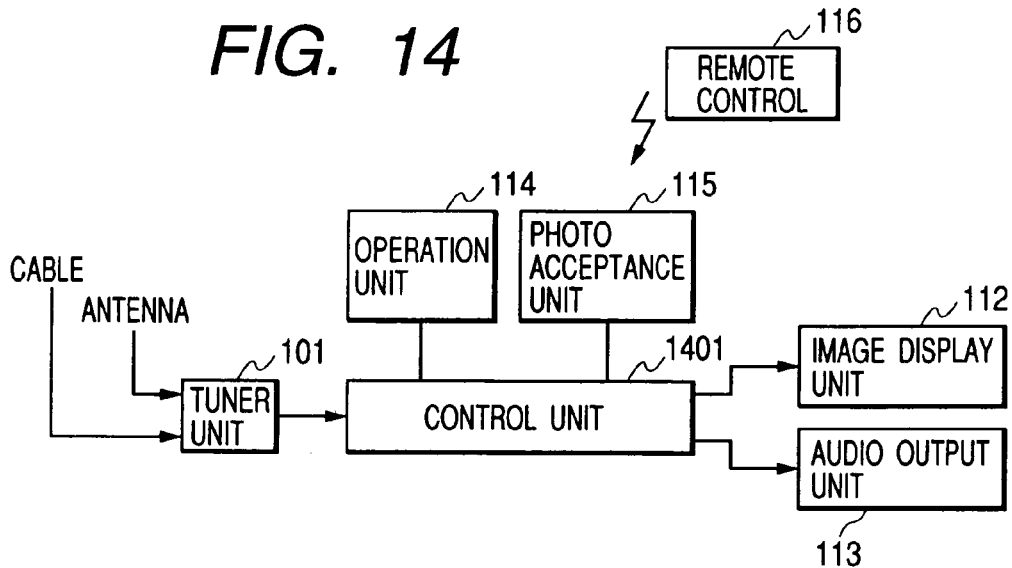
FIG. 14 is a block diagram showing the configuration of a digital TV broadcast receiving apparatus constituting a third embodiment of the present invention.

In the following there will be explained, as a second embodiment, a memory medium to which the present invention is applied. FIG. 14 is a block diagram of a digital television broadcast receiving apparatus utilizing the above-mentioned memory medium, wherein components equivalent to those in FIG. 1 are represented by same numbers and will not be explained further.

Referring to FIG. 14, a control unit 1401 is provided with a ROM storing a program for executing a process similar to that executed by the components 102 to 106, 108 to 111, 117 to 119 in FIG. 1, a RAM as a work memory and a CPU for executing the program stored in the ROM.

Then, in response to the operation on the operation unit 114 and the remote controller 116, the control unit 1401 read the aforementioned program from the ROM and processes the signal entered from the tuner unit 101 according to thus read program, and sends the processed signal to an image display unit 112 and an audio output unit 113.

In the present embodiment, as the EPG data from plural input sources are displayed on a same image, the user can easily find the desired program information without switching the EPG image for each input source.

Also the EPG image display with improved recognizability can be obtained by varying the EPG display color for each input source.

Also, in the present embodiment, the EPG's of the observable channels are integrated from plural input sources and all such integrated EPG is displayed within the range designated by the user, but it is also possible to display only the EPG's searched, among the EPG information from plural input sources, by the system control unit 118 based on the search condition set by the user.

FIG. 11 shows an example of the integrated EPG image showing only the EPG's searched according to the search condition set in a search condition setting image shown in FIGS. 10A and 10B.

In addition to the display form shown in FIG. 11, it is also possible to change the display form between the searched EPG and the non-searched EPG as shown in FIG. 12.

It is furthermore possible to list the searched results in the order of the broadcasting time.

Also, in the present embodiment, the EPG's from different transmission paths such as ground wave, CS, BS etc. are displayed on a same image, but it is also possible display the EPG's of plural TS data with different carrier waves receivable by the CS as the integrated EPG. In such case there may be provided plural tuners or a single tuner may be used on time-shared basis to fetch the EPG's from the plural TS data.

Similarly it is also possible to display the EPG's of plural TS data supplied from different cables, as the integrated EPG. For example the EPG's supplied from the respective cable lines in a CATV optical fiber cable may be integrated in the display.

Also in the present embodiment, there are provided plural tuners for receiving the signals from different transmission paths, but there may be adopted a configuration in which the television signals and the program information data relating to such television signal are entered from plural external receiving apparatus for receiving the respectively different transmission paths.

Also in the present embodiment, there are entered EPG data encoded according to the MPEG2 standard, but the format of the input data is not limited to such standard and there may be employed the input data encoded in other methods.

Further, there may be entered the data of plural encoding formats and there may be adopted a configuration with plural decoders respectively corresponding to such data.

Also in the present embodiment, there can be set two main EPG's but there may be set the EPG's of an arbitrary number for the different input sources.

Also in the present embodiment, there can be set three combination patterns for the integrated EPG, but there may set the patterns in an arbitrary number.

Also the present embodiment has been explained on a case of receiving the television signal, but the present invention is likewise applicable to the case of an audio signal or an information signal supplied through a network.

In the following there will be explained a third embodiment. The digital TV broadcast receiving apparatus of the present embodiment is same in configuration as that of the first embodiment, and the function of such apparatus will be explained in detail with reference to FIG. 1, excluding however the configuration of the function same as that in the first embodiment.

The difference from the first embodiment lies in the detailed EPG. In the first embodiment, the detailed EPG for each program is displayed in a frame different from the display frame for the main EPG, and the main EPG and the detailed EPG are independently displayed without integration. In the third embodiment, the main EPG and the detailed EPG are integrated as will be explained in the following.

Figure 15:
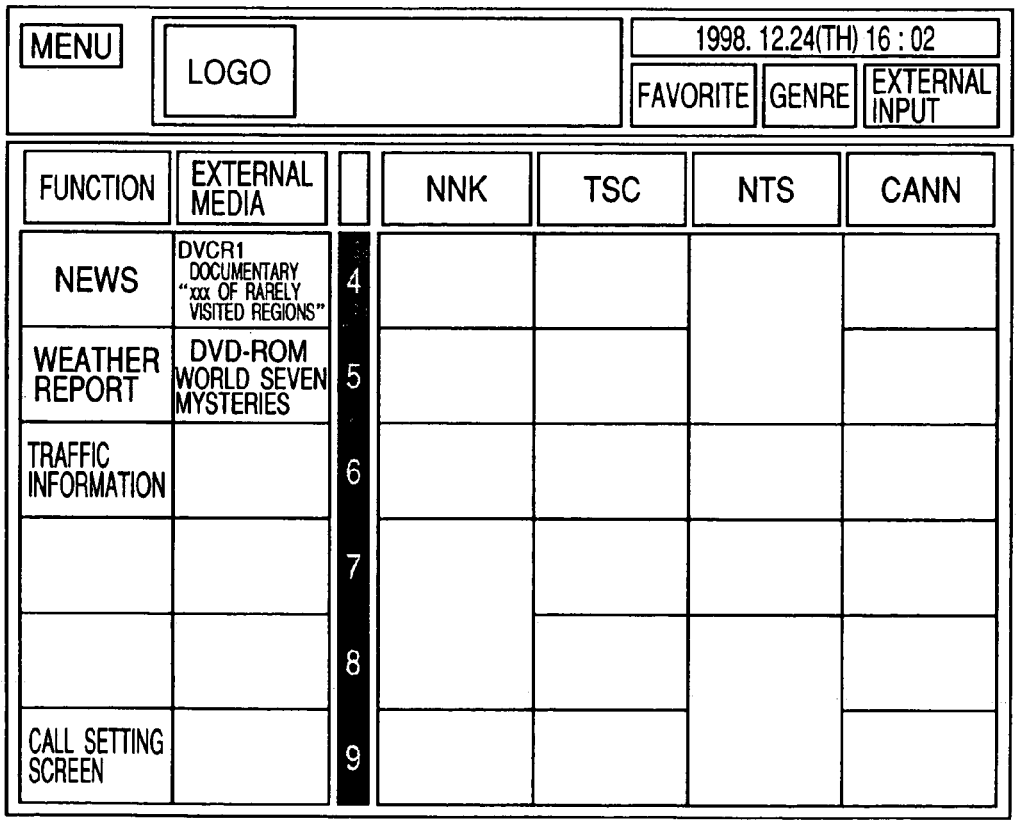
FIG. 15 is a view showing an example of display of an normal EPG image.

In the present embodiment, the main EPG's with different input sources are not integrated, and the integrated EPG in the present embodiment means the integration of the main EPG and the detailed EPG. The display operation of the normal EPG is same as in the first embodiment, and will not, therefore, be explained and an example of such display is shown in FIG. 15.

At first there will be explained the integrated EPG display operation. When the integration button to be explained later is depressed in the operation unit 114 or the remote controller 116, an instruction therefor from the operation unit 114 or from the remote controller 116 through the light receiving unit 115 is supplied to the system control unit 118.

In response to the instruction for the integrated EPG display from the operation unit 114 or the light receiving unit 115, the system control unit 118 controls the various units in the following manner, in order to acquire the detailed EPG data set in the integrated EPG display setting image to be explained later. In the present embodiment, the all-station EPG of BS broadcast is set for the main EPG while the station-specific EPG of BS broadcast is set for the detailed EPG, by the setting method to be explained later.

Since the all-station EPG data are received periodically to always store the latest data in the memory 107, the all-station EPG is not acquired in the present embodiment in response to the instruction for the integrated EPG display, but it is also possible to acquire the all-station EPG in response to such instruction for the integrated EPG display.

Then the tuner unit 101 executes a tuning operation in succession in order to acquire the station-specific EPG data, thereby receiving respective TS data. Each received TD data are supplied through the descrambler 102 to the demultiplexer 103, which extracts the station-specific EPG data from each TS data, for supply to the memory 107.

Then the system control unit 118 reads, from the memory 107, the station-specific EPG data corresponding to the channel and the broadcasting date and time based on the integrated EPG display condition designated by the user or on a default condition. It also reads, from the memory 107, the all-station EPG data around the integrated EPG display condition, within a range displayable on the display screen. The integrated EPG display condition and the default condition will be explained later.

Also the system control unit 118 executes a search process based on a search condition designated for the station-specific EPG data as will be explained later or on a default condition, thereby extracting data matching the search condition from the station-specific EPG data. The data extracted from the station-specific EPG data and the all-station EPG data are supplied to the EPG decoder 106.

Then, the EPG decoder 106 executes decoding on the EPG data extracted from the station-specific EPG data and the all-station EPG data entered from the system control unit 118 and sends the decoded EPG data D4 to the EPG image construction unit 108.

Based on the EPG data extracted from the station-specific EPG data and the all-station EPG data entered from the system control unit 118, the EPG image construction unit 108 sends a character signal for constituting the integrated EPG image to the display control unit 109. In case the integrated EPG image display is instructed by the operation unit 114 and the remote controller 116, the character signal corresponding to the integrated EPG image from the EPG image construction unit 108 is supplied to the image display unit 112.

Figure 16:
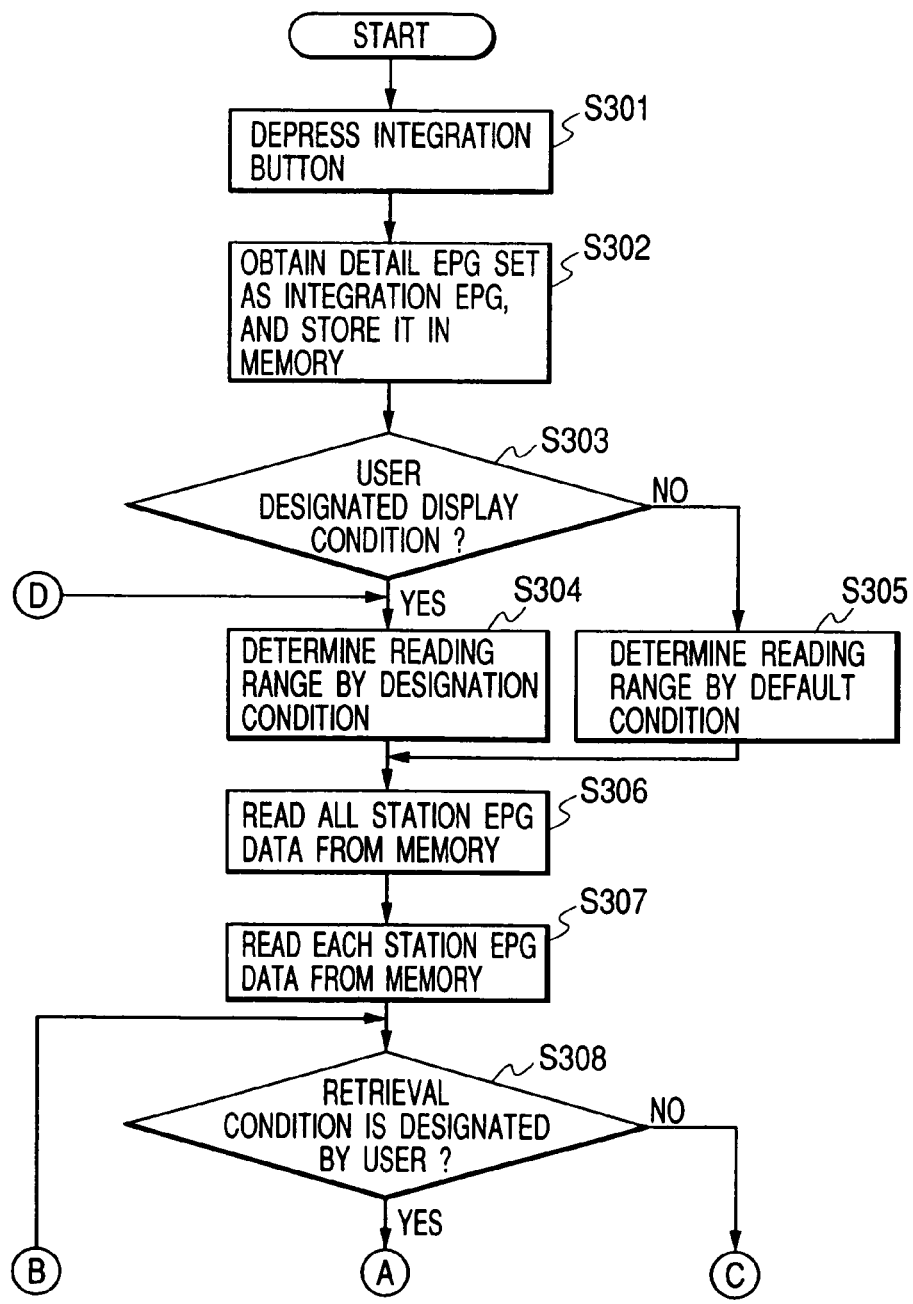
FIG. 16 is comprised of FIGS. 16A and 16B showing flow charts of the operation sequence of a system control unit 118 in the integrated EPG display in the third embodiment.
Figure 16B:
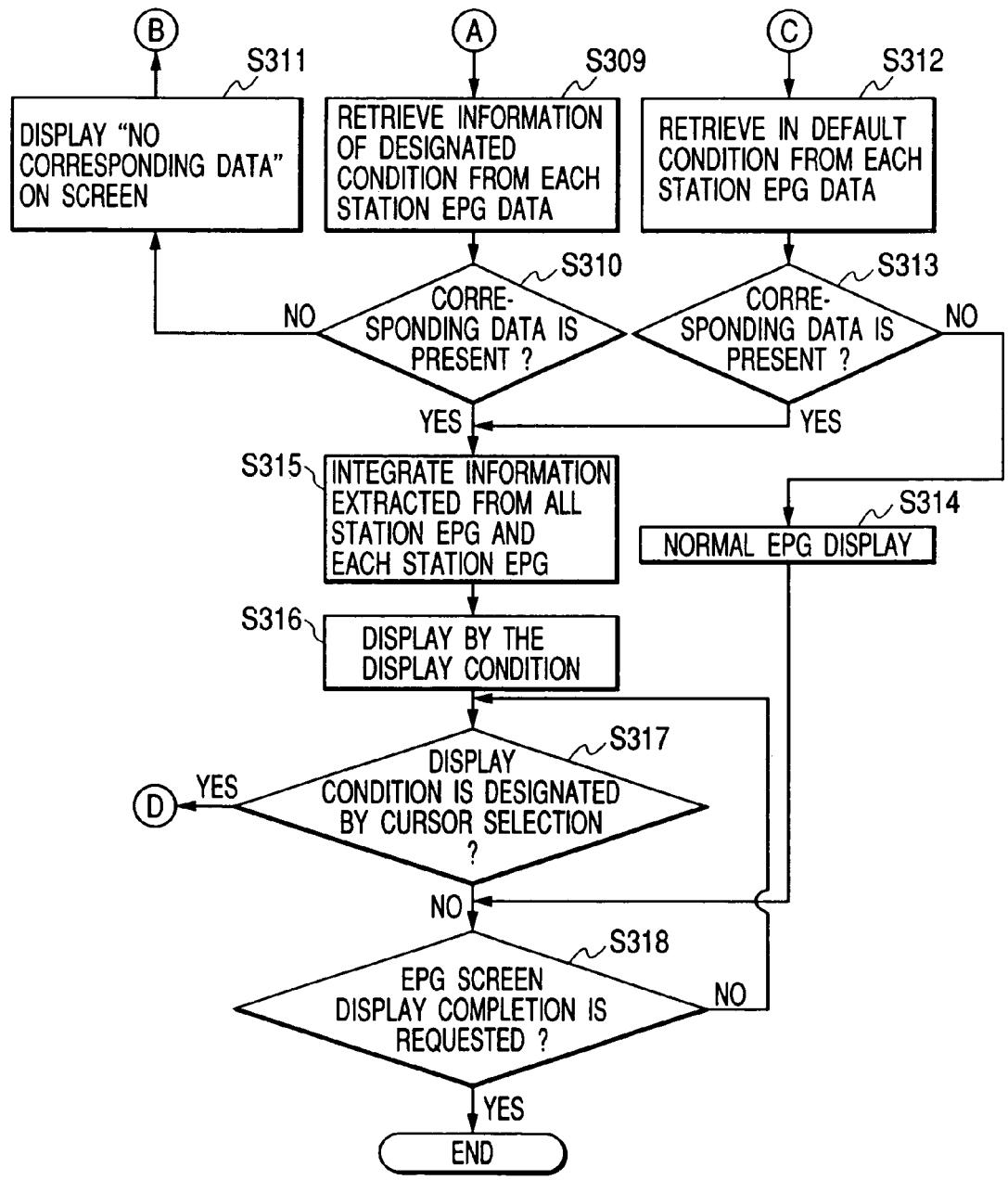

In the following there will be explained the details of the integrated EPG display operation. FIGS. 16A and 16B are flow charts showing the operation sequence of the integrated EPG display operation of the system control unit 118. When the user depresses the integration button 407 shown in FIGS. 4A and 4B to request the integrated EPG display in a step S301, there are acquired the detailed EPG data corresponding to the detailed EPG set in the integrated EPG setting image to be explained later. In the present embodiment, as the station-specific EPG is set as the detailed EPG, the station-specific EPG data are acquired as explained in the foregoing and are stored in the memory 107 (step S302).

In a step S303, there is discriminated whether the integrated EPG display condition is designated by the user, and, if designated, there is determined the range of the station-specific EPG data and the all-station EPG data around the aforementioned integrated EPG display condition to be read from the memory 107, according to the channel and the time zone based on the designated display condition (S304).

If the integrated EPG display condition is not designated, there is determined the range of the station-specific EPG data and the all-station EPG data around the aforementioned integrated EPG display condition to be read from the memory 107, according to the channel and the time zone based on the default condition (S305). In the present embodiment, a time zone close to the current time is selected, in the present embodiment, as the default integrated EPG display condition, so that, in the absence of the designation of the integrated EPG display condition by the user, the station-specific EPG data of a time zone close to the current time and the all-station EPG data around such time zone are read from the memory 107.

Then the all-station EPG data are read from the memory 107 according to the reading range determined in the steps S304 and S305 (S306), and the station-specific EPG data are also read from the memory 107 (S307). The system control unit 118 reads EIT, SDT etc. stored in the memory 107 as explained before.

Then a step S308 discriminates whether the search condition for the station-specific EPG data is designated by the operation unit 114 or the remote controller 116.

If the search condition is identified to be designated, the system control unit 118 executes the search process based on the designated search condition (S309). The designated search condition is to search and extract the designated information from the station-specific EPG data, and is not applicable to the all-station EPG data. The search condition can for example be character data for example a keyword entered by the user, such as the name of an actor, title of a music or a classified genre, and the system control unit 118 extracts data matching the search condition by comparing the designated character data with those for outlining the program, described in the EIT data in the station-specific EIT data.

Then there is discriminated whether the data matching the search condition are present, based on the result of search in S309 (S310). If the data matching the search condition are judged absent, there is displayed a message such as "no corresponding data" (S311), and the sequence returns to the step S308 to discriminate whether a new search condition is designated. On the other hand, if the step S312 identifies that the data matching the search condition are present, the sequence proceeds to a step S315.

On the other hand, if the step S308 identifies that the search condition is not designated, the system control unit 118 executes search process on the station-specific EPG data based on the predetermined default condition (S312), and a step S313 discriminates whether there are data matching the default condition.

If the data matching the default condition are judged present, the sequence proceeds to a step S315, but, if the data matching the default condition are judged absent, the normal EPG is displayed and the sequence proceeds to a step S318 (S314). The default condition can be data capable of complementing the all-station EPG data, for example image data of an introductory sentence for the program content or a representative scene of the program.

A step S315 integrates the data extracted from the station-specific EPG data and the all-station EPG data. In executing such integration, the system control unit 118 has to discriminate whether the data extracted from the station-specific EPG data and the all-station EPG data belong to a same program.

In the present embodiment, the data of all-station EPG and station-specific EPG in the BS broadcast are integrated, and, in case the data to be integrated are entered from a same broadcast system as mentioned above, there is assigned a unified specific ID to each program. Consequently the system control unit 118 compares the ID attached to the data extracted from the station-specific EPG data and the ID attached to the all-station EPG data, thereby discriminating whether these data belong to a same program.

In case the main EPG data are entered from the all-station EPG data and the detailed EPG data are entered from CATV or a TV guide site on the internet, namely in case the data to be integrated are entered from different systems, the program ID attached to the EPG data becomes different depending on the system. Therefore, the system control unit 118 executes discrimination by the coincidence of the date, time, channel, character codes of initial several characters of the program title etc., thereby determining whether the data to be integrated belong to a same program.

The data extracted from the station-specific EPG data, identified by the system control unit 118 to belong to the same program, are integrated with the all-station EPG data.

A step S316 expands the display frame according to the integrated EPG display condition designated by the user or to the default condition, and displays the program information corresponding to the EPG data integrated in the step S315, in the expanded display frame.

Then there are selected the channel and the time zone which are displayed only in the all-station EPG by the operation of the operation unit 114 or the remote controller 116, and there is discriminated whether a new integrated EPG display condition is designated (S317). If an integrated EPG display condition is identified to be designated, the sequence returns to the step S304 to execute the process as explained in the foregoing. On the other hand, if the integrated EPG display condition is not identified to be designated, the sequence proceeds to a step S318.

Now there will be explained the aforementioned integrated EPG display condition. The display format in displaying the integrated EPG display in the present embodiment is as follows.

Figure 17:
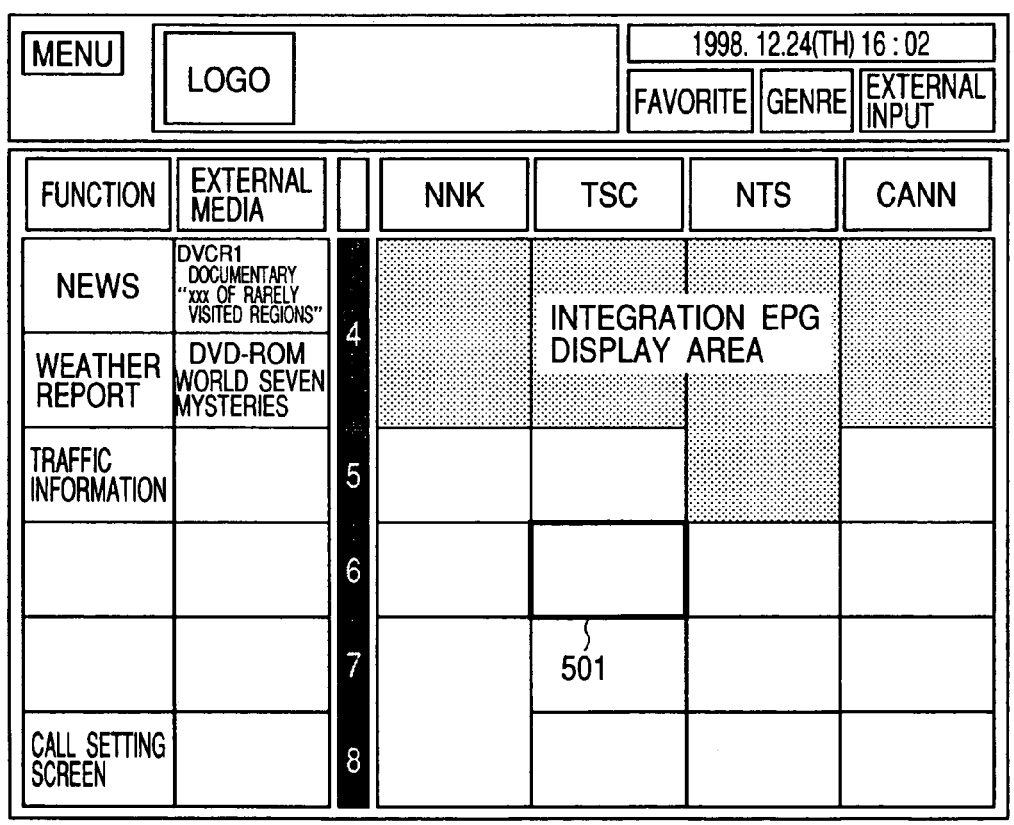
FIG. 17 is a view showing examples of display of an integrated EPG in the third embodiment.

In a first display format shown in FIG. 17, the display frame of the current time zone is expanded and the information relating to the integrated EPG data is displayed therein. In FIG. 17, as the current time is 16:02, the display frame of the time zone of p.m. 4:00 in the program table is extended to display more detailed program information, namely the station-specific EPG and the program information from the internet or package media.

Figure 18:
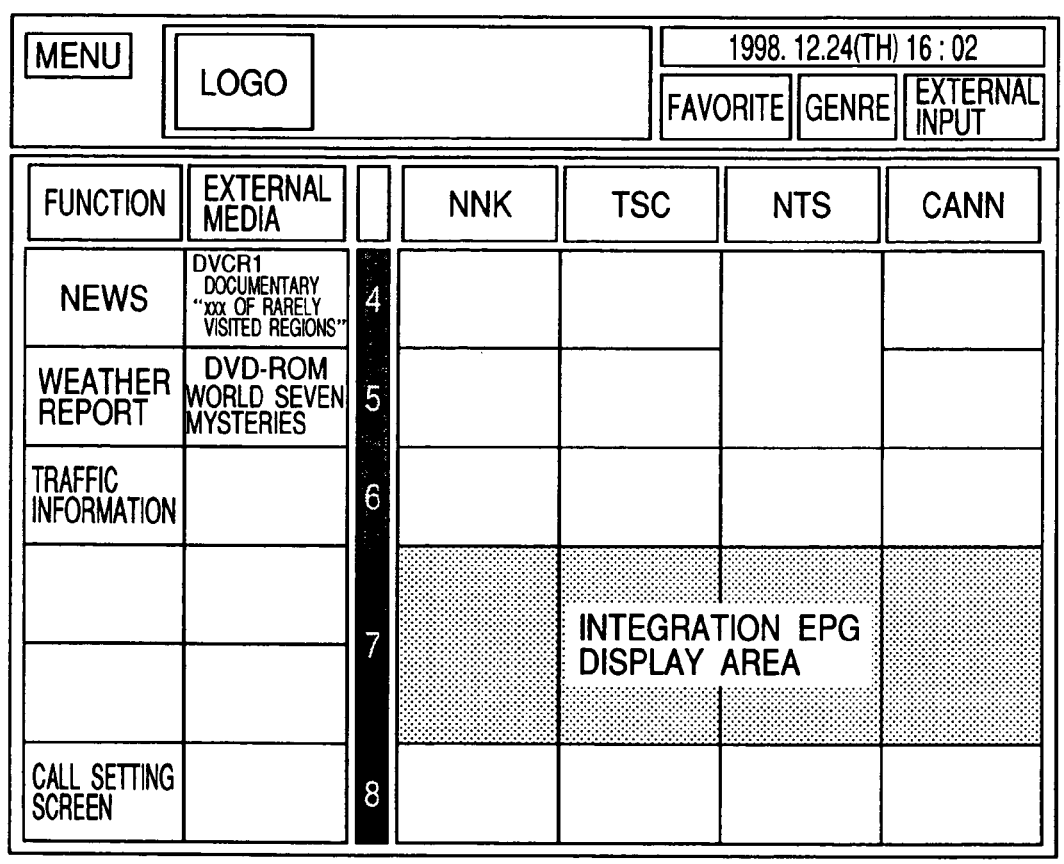
FIG. 18 is a view showing examples of display of an integrated EPG in the third embodiment.

In a second display format shown in FIG. 18, the display frame of a time zone designated by the user is expanded and the information relating to the integrated EPG data is displayed therein. In FIG. 18, the display frame of a time zone of p.m. 7:00 is expanded according to the designation by the user.

Figure 19:
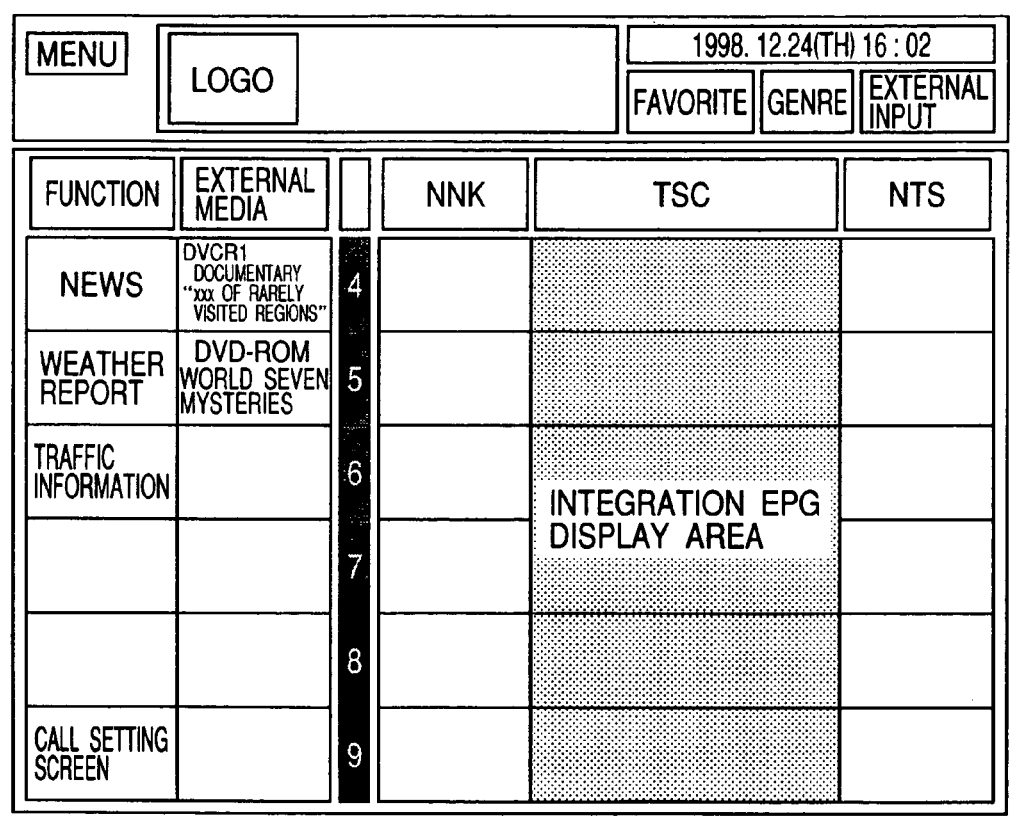
FIG. 19 is a view showing examples of display of an integrated EPG in the third embodiment.

In a third display format shown in FIG. 19, the display frame of the channel currently observed by the user is expanded and the information relating to the integrated EPG data is displayed therein. In FIG. 19, the display frame for the TSC channel, which is currently observed by the user, is expanded.

In a fourth display format, the display frame of a channel designated by the user is expanded and the information relating to the integrated EPG data is displayed therein, and the example of such display is same as shown in FIG. 19. In this case, the display frame for the TSC channel, which is designated by the user, is expanded.

Figure 20:
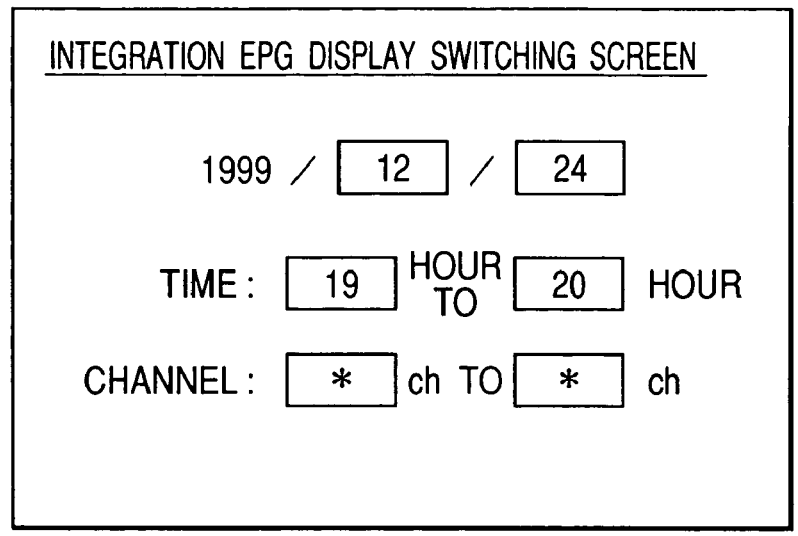
FIG. 20 is a view showing an example of display of an integrated EPG display condition designating image in the third embodiment.

In the present embodiment, the display is executed according to any of the foregoing display formats, and the integrated EPG can be displayed in a desired range, according to the integrated EPG display condition designated by the user on the integrated EPG display condition setting image shown in FIG. 20, through the operation of the operation unit 114 or the remote controller 116.

In case the integrated EPG display condition is not designated by the user, the integrated EPG is displayed according to the default condition. One of the foregoing formats can be selected as the default condition. In the present embodiment, the first display format for expanding the display frame of a time zone around the current time is expanded and displaying the integrated EPG therein is selected as the default condition.

In the following there will be explained the operation unit 114 and the remote controller 116. The operation unit 114 and the remote controller 116 in the present embodiment are substantially same as those in the first embodiment, as exemplified in FIGS. 4A and 4B. However the change button 406 functions differently from that in the first embodiment.

In the present embodiment, by the depression of the change button 406 in the course of display of the integrated EPG image, the integrated EPG display condition setting image is displayed as shown in FIG. 20 whereby the desired integrated EPG display condition can be designated.

Also in the integrated EPG image, the selecting cursor 501 can be moved to a time frame on the time axis or to a channel frame on the channel axis, and, by positioning the cursor 501 in a time frame or a channel frame and depressing the determination button 405, the time frame or channel frame thus selected is expanded and the integrated EPG is displayed therein.

Figure 21:
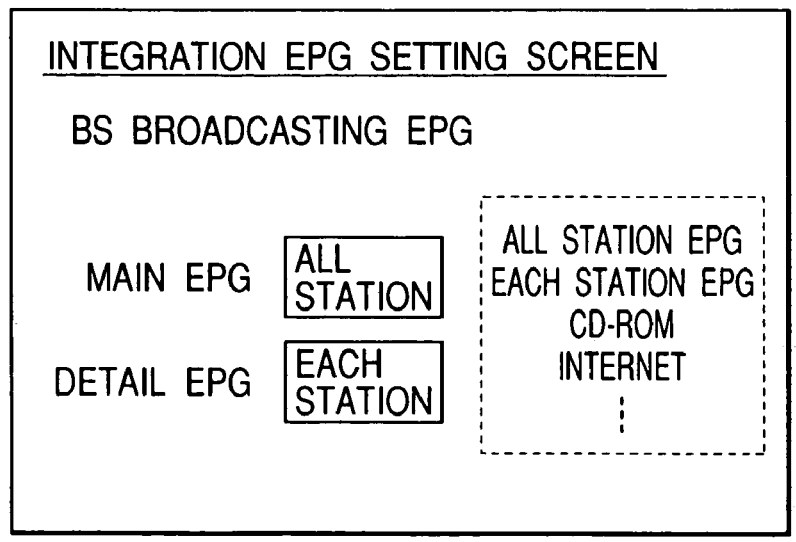
FIG. 21 is a view showing an example of display of an integrated EPG setting image in the third embodiment.

In the following there will be explained the method for setting the combination pattern of the integrated EPG. At first the menu button 409 shown in FIGS. 4A and 4B is depressed and a menu item for displaying the integrated EPG image shown in FIG. 21 is selected from the unrepresented menu items, thereby displaying the integrated EPG image. In FIG. 21, there is displayed a list of the kinds of EPG's that can be entered. The user selects and sets the main EPG and the detailed EPG within such list.

In the present embodiment, as explained in the foregoing, the desired program information searched in the detailed EPG data is displayed in integration with the main EPG, so that the user can confirm the desired program information with a limited number of operations without being required to switch the EPG image in order to confirm the detailed information.

Also in the present embodiment, desired information is searched in the detailed EPG data, separately from the main EPG data, so that the user can easily find the desired program information without being required to confirm the detailed EPG.

Also in the present embodiment, the integrated EPG is displayed by expanding the display frame for the main EPG, so that there can be provided an EPG image of improved recognizability.

In the present embodiment, the all-station EPG is selected as the main EPG and the station-specific EPG is selected as the detailed EPG, but the EPG from internet or from package media may also be selected as the detailed EPG.

For example, in case the internet is selected for the detailed EPG, the system control unit 118 executes automatic access to the internet browser through the modem 121 in response to the instruction for the integrated EPG display, thereby acquiring the EPG data of the program information from a site containing such information and sending such information to the memory 107.

Also in case the CD-ROM is selected for the detailed EPG, the system control unit 118 controls the connected CD-ROM drive by the CD-ROM drive interface 123 in response to the instruction for the integrated EPG display, thereby acquiring the EPG data and sending them to the memory 107.

In the present embodiment, the integration of the EPG data is executed for the time zone and the channel based on the display condition designated by the user or on the default condition, but such integration may be executed on the EPG data for all the observable channel and time zone.

In the present embodiment, the station-specific EPG data are acquired without limiting the range of acquisition in response to the instruction for the integrated EPG display, but there may be acquired the station-specific EPG data corresponding to a designated display condition, based on the designation of the integrated EPG display condition by the user.

Also in the present embodiment, the integrated EPG is displayed in response to the depression of the integration button, but it is also possible to display the integrated EPG as a default state, without requiring the operation of the user.

Figure 22A:
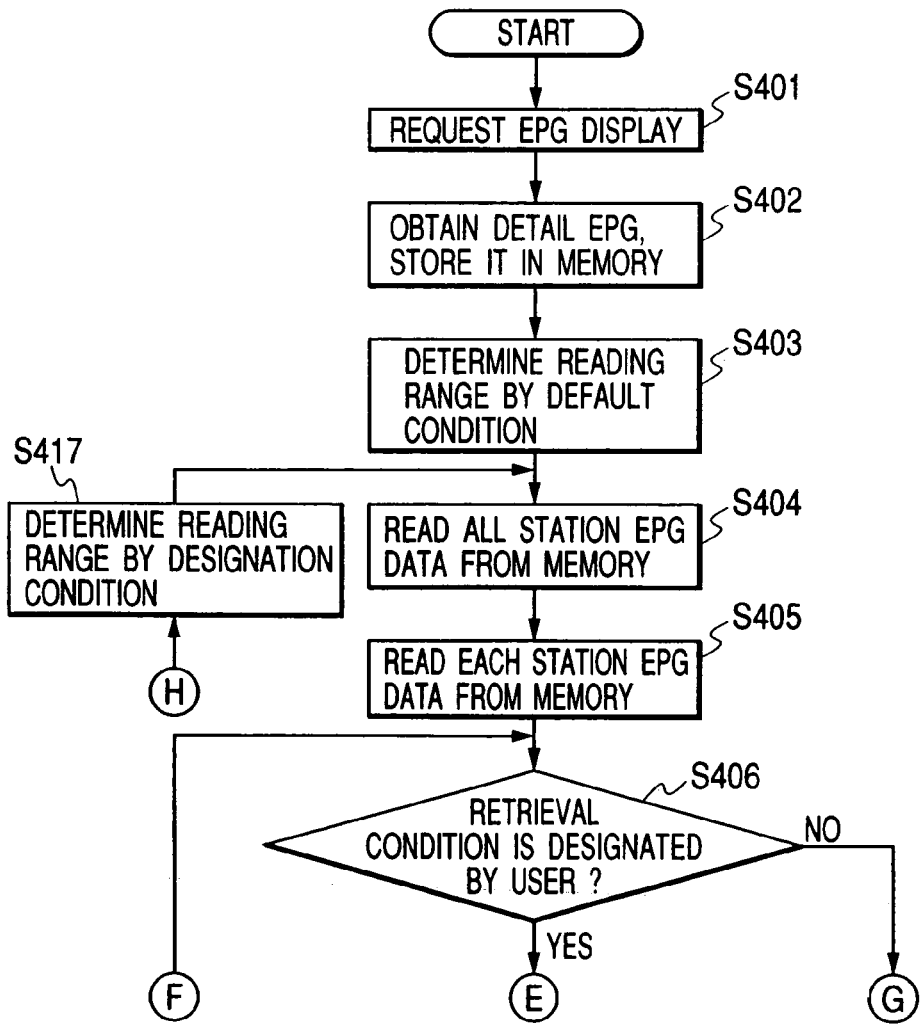
FIG. 22 is comprised of FIGS. 22A and 22B showing flow charts of the operation sequence of a system control unit 118 in the EPG display in the third embodiment.
Figure 22B:
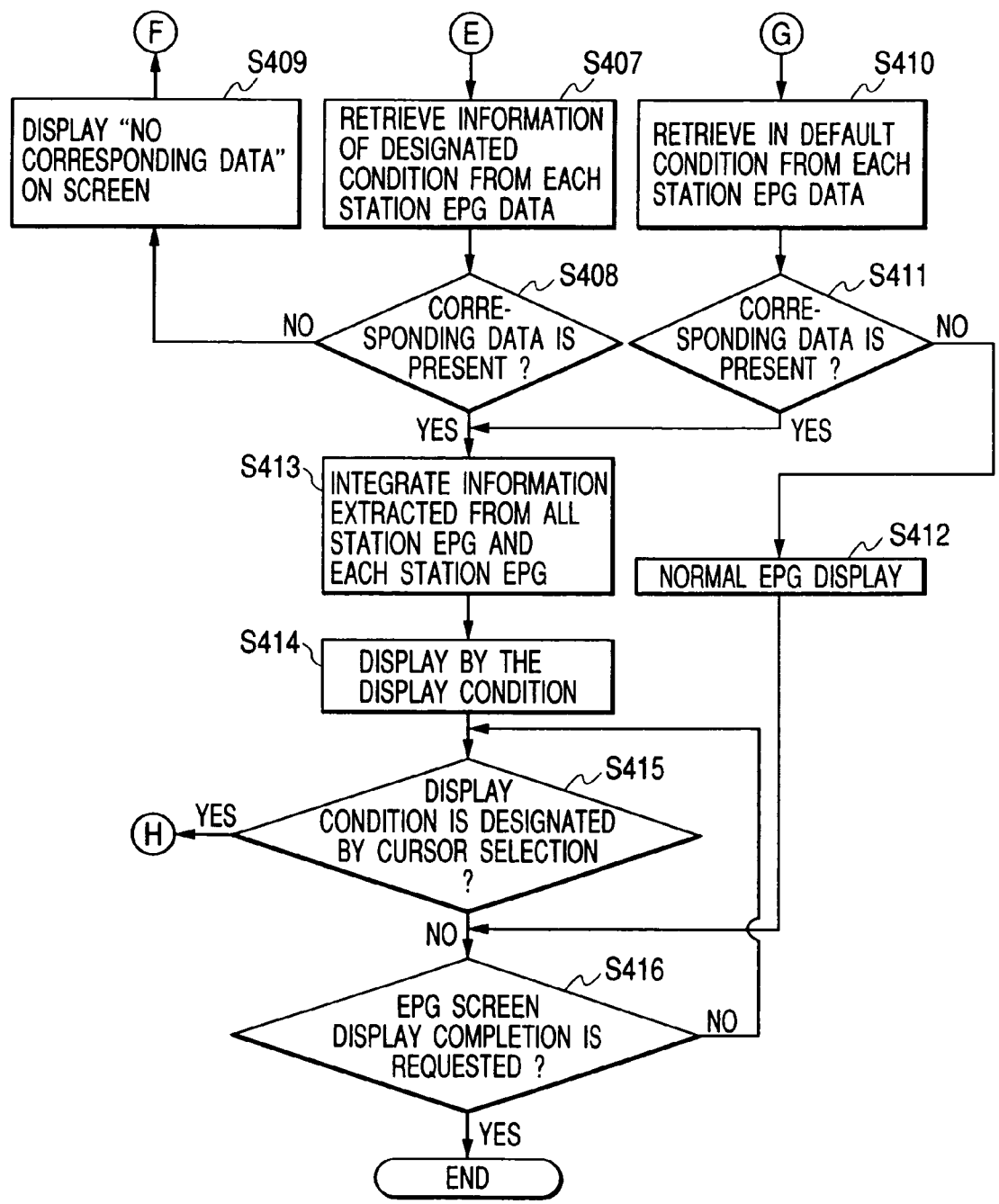

FIGS. 22A and 22B are flow charts showing the operation sequence of the EPG display operation by the system control unit 118 in such case.

If the EPG display is requested from the user in a step S401, the detailed EPG data corresponding to the detailed EPG set as a default condition are acquired and stored in the memory 107 (S402). For example, if the station-specific EPG is set as the detailed EPG as default, the tuner unit 101 is so controlled as to execute the tuning operation in succession to extract the station-specific EPG data.

A step S403 determines the reading range of the detailed EPG data and the station-specific EPG data according to the display condition set as the default condition. For example if the time zone around the current time is selected as the default display condition, there are read, from the memory 107, the station-specific EPG data around the current time and the all-station EPG data around such time zone.

Steps S404 to S416 are same as the steps S306 to S318 in the flow charts shown in FIGS. 16A and 16B and will not therefore be explained further. In case the display condition is designated by the cursor in the step S415, there are determined the reading range of the detailed EPG data and the all-station EPG data under the condition designated by the cursor, and the sequence then proceeds to the step S404.

In the present embodiment, the EPG image and the video image are displayed on the internal monitor of the apparatus, but there may also be provided a video output terminal for outputting the video signal corresponding to the EPG data and the video signal corresponding to the video data to an external display apparatus.

Also in the present embodiment, there has been explained a case of receiving the television signal, but the present invention is likewise applicable to a case of receiving an audio signal or an information signal supplied through a network.

As explained in the foregoing, the present invention provides display of plural program information relating to the information data of plural programs on a same image, whereby the user can easily find the desired program information without being required to switch the program information display image.

Also the display format of the program information is rendered variable, thereby realizing display of improved recognizability.

What is claimed is:

1. A method of displaying an electric program guide (EPG) comprising steps of:
    displaying switchably a normal EPG and an integrated EPG;
    displaying, in a program displaying region, a normal program table where program information relating to a program broadcast distributed in each of channels of a selected input source is displayed in a display frame defined by a channel display axis and a time display axis, at the normal EPG;
    displaying, in the program displaying region, an integrated program table where program information relating to a program broadcast distributed in a channel formed by combining a plurality of input sources capable of being set by a user is displayed in a display frame defined by a channel display axis and a time display axis, at the integrated EPG; and
    displaying, in a peripheral region of the program displaying region, a predetermined display item commonly to the normal EPG and the integrated EPG.

2. The method according to claim 1, wherein the predetermined display item is at least one or more of detailed program information other than the program information relating to the program selected in the normal program table or the integrated program table, information not relating to the program, and a GUI for displaying the information not relating to the program.

3. The method according to claim 2, wherein the detailed program information is at least one of a program content explanation and a representative scene image.

4. The method according to claim 2, wherein the information not relating to the program is at least one of news, a weather prediction, and traffic information.

5. The method according to claim 2, wherein the information not relating to the program includes a name of an external connection medium, and program information of a program recorded in the external connection medium.

* * * * *